United States Patent
Shinomoto et al.

(10) Patent No.: US 7,340,947 B2
(45) Date of Patent: Mar. 11, 2008

(54) TIRE TESTING MACHINE AND AXIS MISALIGNMENT MEASURING METHOD FOR TIRE TESTING MACHINE

(75) Inventors: Yoshiyuki Shinomoto, Takasago (JP); Mikio Kato, Takasago (JP); Toshikatsu Nonaka, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 11/578,415

(22) PCT Filed: May 12, 2005

(86) PCT No.: PCT/JP2005/008665

§ 371 (c)(1),
(2), (4) Date: Oct. 13, 2006

(87) PCT Pub. No.: WO2005/111569

PCT Pub. Date: Nov. 24, 2005

(65) Prior Publication Data
US 2007/0220964 A1 Sep. 27, 2007

(30) Foreign Application Priority Data

| May 14, 2004 | (JP) | 2004-145570 |
| May 19, 2004 | (JP) | 2004-149676 |
| May 19, 2004 | (JP) | 2004-149677 |
| May 19, 2004 | (JP) | 2004-149678 |

(51) Int. Cl.
*E01C 23/00* (2006.01)
(52) U.S. Cl. ...................................................... 73/146
(58) Field of Classification Search .................. 73/146, 73/146.2, 146.3, 146.4, 146.5, 146.8
See application file for complete search history.

(56) References Cited

U.S. PATENT DOCUMENTS

| 4,159,730 A * | 7/1979 | Osada et al. ................. 152/158 |
| 5,803,553 A * | 9/1998 | Wei ........................ 301/63.107 |
| 6,074,118 A * | 6/2000 | Ferrari et al. .................. 403/31 |
| 6,672,353 B2 * | 1/2004 | Riva et al. .................... 152/540 |

FOREIGN PATENT DOCUMENTS

| JP | 6 45239 | 11/1994 |
| JP | 11 223571 | 8/1999 |
| JP | 2004 28700 | 1/2004 |

\* cited by examiner

*Primary Examiner*—Jewel Thompson
(74) *Attorney, Agent, or Firm*—Oblon, Spivak, McClelland, Maier & Neustadt, P.C.

(57) ABSTRACT

A spindle direction engaging device moves at least one of spindles in a mutually separating direction to closely engage a lock piece or a lock portion in a spindle direction of spindles while the lock piece is locked to the lock portion when a tire is not mounted. A second spindle includes a groove extending in a peripheral direction along an outer periphery thereof in sliding contact with the lock piece; sliding surfaces of the lock piece and the groove are receiving portions formed as flat surfaces to receive separating forces acting on both the spindles. A correction device corrects a gap between an inner ring of the spindle bearing and rolling elements of the spindle bearing, or a gap between an outer ring of the spindle bearing and the rolling elements of the spindle bearing, while the spindle is rotating. Preload bolts include a coolant passage formed by hollowing a corresponding portion passing a mounting hole of a detector, and a coolant can thus be supplied to the coolant passage.

16 Claims, 22 Drawing Sheets

TIRE TESTING MACHINE AND AXIS MISALIGNMENT MEASURING METHOD FOR TIRE TESTING MACHINE

TECHNICAL FIELD

The present invention relates to a technology of a tire testing machine used to measure tire uniformities.

BACKGROUND ART

A tire testing machine used to measure tire uniformities (static or dynamic characteristics of a tire) includes a spindle device which rotationally holds a tire while the tire is inflated at a predetermined internal pressure, and a drum device which applies a rotational force by bringing a drum in contact with an outer peripheral surface of the tire held by the spindle device (refer to patent document 1: Japanese Patent Laid-Open No. 2004-28700, or patent document 2: Japanese Utility Model Laid-Open No. H6-45239, for example).

However, for this type of tire testing machine, it is not possible to avoid a load from being generated in the tire testing machine itself due to a tire being held in an inflated state, or being rotated while the tire uniformities are being measured, and the load causes a reduction of test accuracy.

The present invention has been devised in view of the above problem, and has an object to provide a tire testing machine, which can restrain the reduction of the test accuracy due to the load generated in the tire testing machine itself, and a method to measure the run out of the tire testing machine.

Specifically, a conventional tire testing machine includes a pair of rims used to mount a tire, a pair of spindles which support the respective rims at respective rotational centers thereof, and a lock piece which holds both the spindles so as to relatively approach to/separate from each other in a predetermined range. The pair of spindles then is disposed vertically coaxially, an upper rim is supported by an upper spindle, and a lower rim is supported at a top end thereof by a lower spindle. One of the upper and lower spindles approaches to/separates from the other one of them thereby causing the upper and lower rims respectively approach to/separate from each other relatively.

This tire testing machine loads a tire on the lower rim while the upper and lower rims are mutually separated, then causes the upper and lower rims to relatively approach to each other, thereby bringing about a hold state where the upper and lower rims are in contact with beads on the both sides of the tire, realizes an engaged state where the upper and lower spindles will not separate, and then supplies the inside of the tire with a pressurized gas (air) to inflate the tire. A drum roller is then pressed against an outer peripheral surface (tread surface) of the tire, and various measurements are carried out while the tire is rotated by a rotation of the drum roller.

However, in the conventional tire testing machine, when the tire is mounted and held, there arises an action to mutually separate the upper and lower rims caused by the state where the tire is inflated by the pressurized air (inflated state), thereby energizing the upper and lower spindles holding the upper and lower rims mutually upward and downward, resulting in eliminating a mechanical play (gap) in the engagement of the upper/lower spindles, and bringing about a stable state without a backlash. Consequently, reliable measured results are to be obtained in the various measurements of the tire. However, it is necessary to detach/attach the upper and lower rims from/to the spindles each time the size of the tire is changed, and there can be generated a variation in the positional relationship for the support between the upper and lower spindles and the respective rims. If a variation arises in the positional relationship, it always leads to an axial run out, a surface run out; and the like when the rims rotate, resulting in influence on the measured results of the tire. Moreover, if there are manufacturing errors and slight deformations caused by handling thereafter on the rims, they also cause a surface run out and an axial run out when the rims rotate.

Thus, there arises a need for measuring whether the rims are properly attached to the upper and lower spindles when the rims are respectively attached to the upper and lower spindles. The measurement of the mounted state of the rims can be optimally carried out by bringing a dial gauge in contact with bead seat surfaces (surfaces which are in contact with the beads of the tire) while the rims are rotating, and it is thus necessary to carry out the measurement before a tire is mounted.

However, in the conventional tire testing machine, since the upper and lower spindles are mutually energized upward and downward, and the upper and lower spindles enter the stable state without backlashes for the first time when the tire mounted and held is inflated by means of the pressurized air as described above, even if the state where the rims are attached is measured without a tire, there is a backlash between the upper/lower spindles, and this state cannot be used for considering a mechanical precision.

Moreover, as another factor, the spindle device of the conventional tire testing machine includes the upper spindle and the lower spindle aligned coaxially, and vertically separable. The upper spindle includes one of the pair of rims, the lower rim includes the other one of the pair of rims, both of the spindles are configured such that the upper spindle is externally engaged with the lower spindle to hold the tire between both the rims.

At an upper portion of the lower spindle is provided a through hole which passes thorough in the radial direction, and there is provided a lock piece with a circular cross section which is supported by the through hole for emerging and retracting. On the other hand, a lock portion which engages with the lock piece is provided on an inner peripheral surface of an upper portion of the upper spindle, and the vertical relative positions of the upper spindle and the lower spindle are determined by locking the lock piece and the lock portion to each other when the upper spindle is externally engaged with the lower spindle. On this uniformity testing device, the test is carried out by mounting a tire on the rims, inflating the tire with air, and rotating the tire. When the tire is inflated with air, the air pressure inside the tire generates separating forces between both the rims, resulting in a separating forces applied to the upper spindle and the lower spindle.

The separating forces are received by contact surfaces between an outer peripheral portion of the lock piece and an inner wall surface of the through hole, and the lock portion which is engaged with the lock piece.

However, in the conventional tire testing machine, since the outer peripheral portion of the lock piece is circular, and there also exists a restriction caused by the size of the lower spindle, when the separating forces are applied, the outer peripheral portion of the lock piece comes in contact with the inner wall surface along a short arc, and an actual area of the contact surfaces (receiving surfaces) of the outer peripheral portion of the lock piece and the inner wall surface of the through hole is very small, resulting in a very high surface pressure applied on the contact surfaces. If the surface pressure of the contact surfaces is very high, the outer peripheral portion of the lock piece or the inner wall surface of the through hole cannot withstand the pressure, and wear is thus generated on them, resulting in a failure.

Moreover, if a high pressure is repeatedly applied to the contact surfaces, the wear of the inner wall surface of the through hole increases the size of the through hole, a run out is generated on the lock piece when the lock piece is protruded/retracted, and the lock piece may not be locked to the lock portion properly.

Further, as another factor, the spindle device for the conventional tire test includes the upper spindle and the lower spindle which are aligned coaxially, and are vertically separable. The lower spindle is stored in a bearing housing, is rotationally supported by a spindle bearing provided between the lower spindle and the bearing housing.

Usually, when the spindles are rotated, since the spindle bearing generates heat due to rolling frictions between rollers and inner/outer rings of the spindle bearing, and the bearing housing and the spindle bearing thus expand, there is generated a difference between gaps between the rollers and the inner/outer rings of the spindle bearing before the test of a tire, and the gaps between the rollers and the inner/outer rings of the spindle bearing during the test of the tire. Therefore, when the spindle bearing is installed in the bearing housing, the gaps between the rollers and the inner/outer rings of the spindle bearing before the test of a tire are usually designed such that the gaps between the rollers and the inner/outer rings of the spindle bearing are as optimal as possible during the test in consideration of the heat generation of the spindle bearing based on the rotational speed of the tire in the test and a period of the test.

However, the amount of the generated heat of the spindle bearing during the test varies according to the rotational speed of the tire and the time, and the gaps thus change according to the temperature. Therefore, even if the gaps are set in advance such that the gaps become optimal during the test when the spindle bearing is installed, there poses such a problem that the gaps vary during the test. The variation of the gaps causes a generation of a run out of the rotating spindles, and may significantly reduce the accuracy of the measurement of the uniformities of a tire.

Further, as another factor, the spindle device of the conventional tire testing machine includes the pair of rims which are respectively brought in contact with the beads on the both side of the tire, and the pair of spindles which support the respective rims at the rotational centers thereof. In most cases, the spindles are separated vertically, the lower spindle is rotationally held by the bearing housing in a tubular shape, and the bearing housing is further held in an externally engaged state by a spindle base in a tubular shape with a larger diameter, for example.

On the bearing housing is provided a flange extending over an upper surface of the spindle base, and the bearing housing and the spindle base are fixed to each other by tightening preload bolts from the flange toward the upper surface of the spindle base in parallel with the rotational axis of the tire. On the upper surface of the spindle base are provided detectors (load detectors such as piezo elements) in a donut shape, through which the preload bolts pass, and the detectors measure loads from the tire in three directions: radial direction, axial direction, and tangential direction, through the bearing housing.

When the spindle rotates at a high speed, friction heat from the bearing, stirring heat from a lubricant, and the like are generated from the bearing in the bearing housing which supports the rotation of the spindle, and the heat influence propagates to both the detectors and the preload bolts. However, the detectors and the preload bolts are different in thermal expansion coefficient, Young's modulus, and the like, there is thus generated a difference in expanded lengths by the influence of the heat, resulting in a measurement error as a temperature drift in measured values of the detectors. Though the temperature drift can be addressed by error correction on a charge amplifier of the detectors (namely setting a state where the temperature drift occurs to an initial value "0") for a measurement of a subsequent change, there is no means to provide a true value based on an absolute value such as a deviation of a spring force on a tire under test in response to the pressing force of the drum, which simply leads to a defect that the measurement accuracy decreases.

In the above-described conventional tire testing machine (patent document 2), though there is provided a coolant passage at a position close to the bearing in the bearing housing, and water is supplied to the coolant passage, the bearing housing is much larger in specific heat and mass compared with the coolant, the temperature of the bearing housing tends to increase as the time elapses, and the temperature of the coolant itself increases accordingly. Therefore, though there is expected a partial cooling effect around the coolant passage and a supply passage of the lubricant, there occurs a flow of heat toward the outside of the bearing housing in portions remote from the coolant passage and the lubricant supply passage, the temperature distribution consequently becomes uneven, and the temperature control applied to the detectors thus becomes difficult.

Moreover, the operation of the tire testing machine is a high speed operation or a low speed operation, or a long term operation or a short term operation, and is thus not constant, the increase of the temperature is thus not constant, and is difficult to expect, and the temperature control of the detector is thus extremely difficult.

DISCLOSURE OF THE INVENTION

To attain the above object, the present invention takes the following means. According to the present invention, there is provided a tire testing machine that includes a first tubular spindle that comprises one of a pair of rims, a columnar second spindle that comprises the other one of the pair of rims, and is contained in the first spindle, lock portions that are provided on a peripheral wall of either one of the first and second spindles, and a lock piece that is provided on the other one of the first and second spindles to engage with the lock portions thereby preventing the first and second spindles from separating from each other, comprising spindle direction engaging means that causes the lock piece and the lock portions in an engaged state to be brought in close contact with each other in an axial direction of the spindles by relatively separating the both spindles when a tire is not mounted on the rims, and the lock piece is engaged with the lock portions.

According to the present invention, the adjustment can be carried out on the device to increase mechanical precision before a tire is mounted, and the rims are attached, resulting in measured results at high accuracy for the measurement of various tire uniformities of a tire.

Namely, according to the present invention, since the spindle direction engaging means is caused to move the first spindle and the second spindle in the mutually separating directions, thereby closely engaging the lock piece and the lock portions each other in the spindle direction (axial direction) of the spindle when the lock piece is engaged with the lock portions, it is possible to realize the same state without mounting a tire (pseudo inflated state) as a conventional state where a tire is mounted and is inflated, to eliminate a mechanical play (gap) included in the engagements, and to bring the either one of the spindles in a stable state without a backlash. Therefore, a measurement of the positional accuracy of the spindles in this stable state can be considered as the mechanical precision of the tire testing machine, which can be used to properly adjust the device, or can be recognized as a correction value used for measured data (can be reflected to the measured results of the tire).

Moreover, the present invention takes the following means. Namely, according to the present invention, there is provided a tire testing machine comprising a tubular first spindle that includes one of a pair of rims, and lock portions on an inner wall, a columnar second spindle that includes the other one of the pair of rims, and is contained in the first spindle, and a lock piece that is engaged with the second spindle so as to radially protrude from and retract into the second spindle between a position to engage with the lock portions to prevent the first spindle and the second spindle from being separated in the spindle direction, and a position to retract from the lock portions, where the second spindle includes a groove that extends in a peripheral direction along an outer periphery thereof, and is in sliding contact with the lock piece, and the lock piece and a sliding contact surface of the groove are receiving portions that are formed as flat surfaces to receive separating forces of the both spindles.

According to the present invention, there is provided a tire testing machine which includes the lock piece, which receives the separating force of both of the spindles, and the receiving portion of the spindle, which is in sliding contact with the lock piece, hardly present wears for a long period.

Namely, according to the present invention, since the lock piece and the sliding contact surface (contact surface) of the groove formed on the second spindle are formed as flat surfaces, and these surfaces server as the receiving portions to receive the separating forces, when the separating forces are received by the receiving portions thereof, contact areas of these receiving portions substantially increase compared with the conventional arc contact between the lock piece and the through hole (the inner wall surface) of the second spindle. Thus, the increased contact areas of the receiving portions reduce the surface pressure applied on the lock piece and the groove on the second spindle compared with the arc contact, the strengths of the lock piece and the second spindle increase against the separating forces by the reduced amount of the surface pressure, the lock piece is hardly broken or the groove of the second spindle hardly wears even if the separating forces are repeatedly applied to the lock piece and the groove of the second spindle, namely the receiving portions, for a long period.

Further, the present invention takes the following means. Namely, according to the present invention, there is provided a tire testing machine that includes a spindle that is used to detachably mount a tire, and spindle bearings that rotationally support the spindle, comprising a correction device that corrects a gap between an inner ring of the spindle bearing and rolling elements of the spindle bearing, or a gap between an outer ring of the spindle bearing and the rolling elements of the spindle bearing while the spindle is being rotated.

According to the present invention, the accuracy of the measurement of the uniformities of the tire can be increased by correcting the gap between the inner ring and the rolling elements and the gap between the outer ring and the rolling elements of the spindle bearing.

Namely, according to the present invention, since there is provided the correction device which corrects the gap between the inner ring and the rolling elements and the gap between the outer ring and the rolling elements of the spindle bearing, even if the amount of the generated heat in the spindle bearing changes, and the gap between the inner ring and the rolling elements and the gap between the outer ring and the rolling elements of the spindle bearing deviate from proper gaps during the tire test, the correction device can correct the gap between the inner ring and the rolling elements and the gap between the outer ring and the rolling elements of the spindle bearing to optimal gaps during the tire test, thereby reducing the run out of the rotating spindle, and thus increasing accuracy of the uniformity measurement of a tire.

Moreover, the present invention takes the following means. Namely, according to the present invention, there is provided a tire testing machine that includes a spindle device that rotationally holds a tire in a state inflated at a predetermined internal pressure, and a drum device that transmits a rotational force to the tire by bringing a drum in contact with an outer peripheral surface of the tire held by the spindle device, comprising detectors that are provided on the spindle device, and can measure the loads generated by the tire, where the detectors are fixed to the spindle device by inserting the preload bolts through the mounting holes provided through the center portion of the detectors, and the coolant passages formed by hollowing at least at a portion that passes the mounting holes of the detectors are provided in the preload bolts, and the coolant can be supplied to the coolant passages.

According to the present invention, when the various uniformities of a tire are measured, it is possible to reduce the influence of the temperature due to an increase of the temperature of the bearing housing and the like caused by the operation (rotation of the tire), thereby acquiring measured results with high accuracy.

Namely, according to the present invention, since the preload bolts used to mount the detectors to the spindle device are hollowed, and the hollowed portions are used as the coolant passages (namely the coolant is supplied to the hollowed portions), it is possible to directly cool the preload bolts themselves. The preload bolts themselves are small in mass compared with the bearing housing and the like, and thus have a smaller thermal capacity, and it is thus possible to relatively easily carry out the temperature control. It is then possible to carry out the temperature control (temperature calibration) of the detectors via the preload bolts without the thermal influence of the bearing housing and the like.

BEST MODE FOR CARRYING OUT THE INVENTION

A description will now be given of a tire testing machine 1 according to a first embodiment of the present invention with reference to FIGS. 1 to 4.

Figure 1:
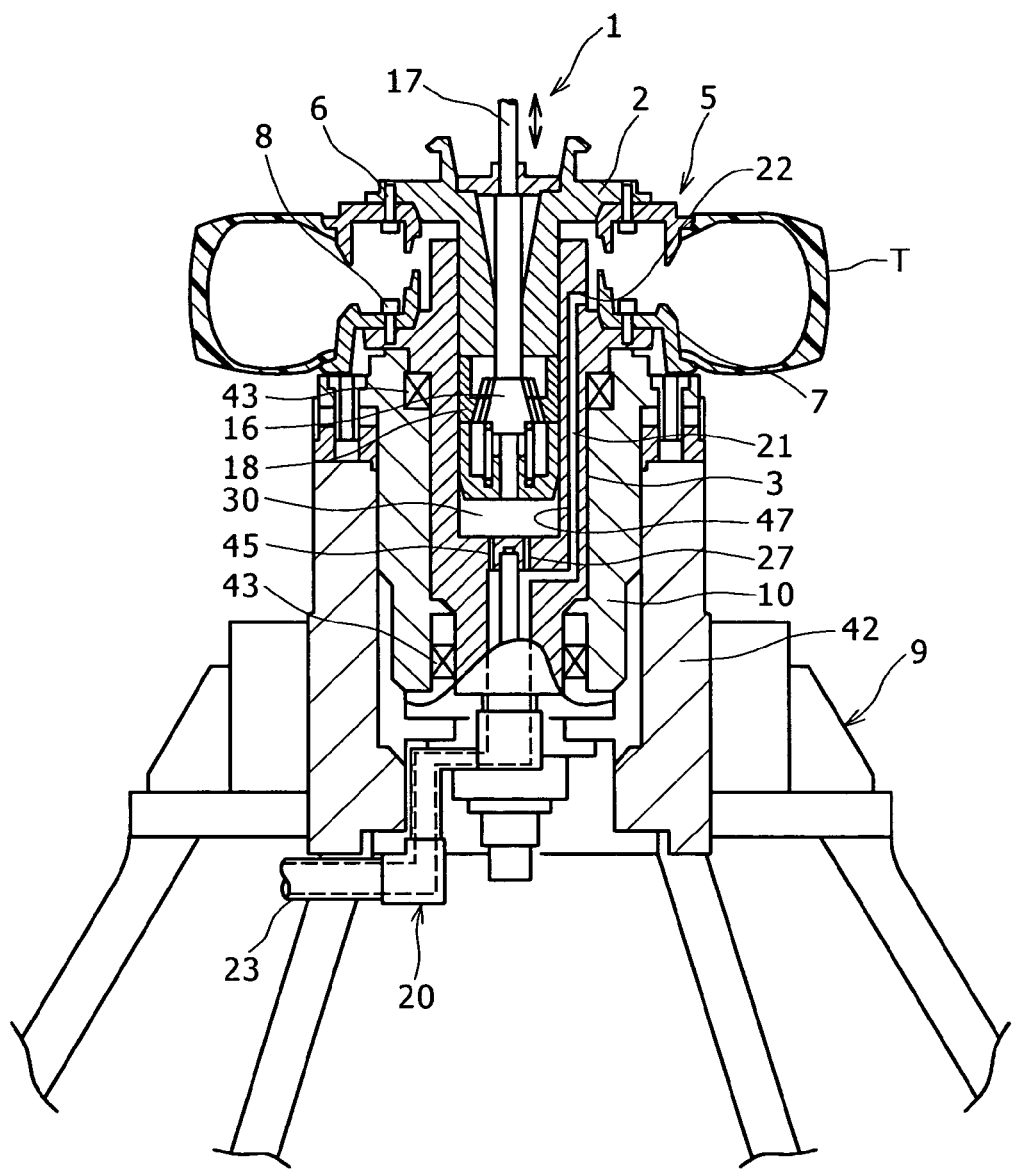
FIG. 1 is a front cross sectional view showing a tire testing machine according to a first embodiment of the present invention.
Figure 2:
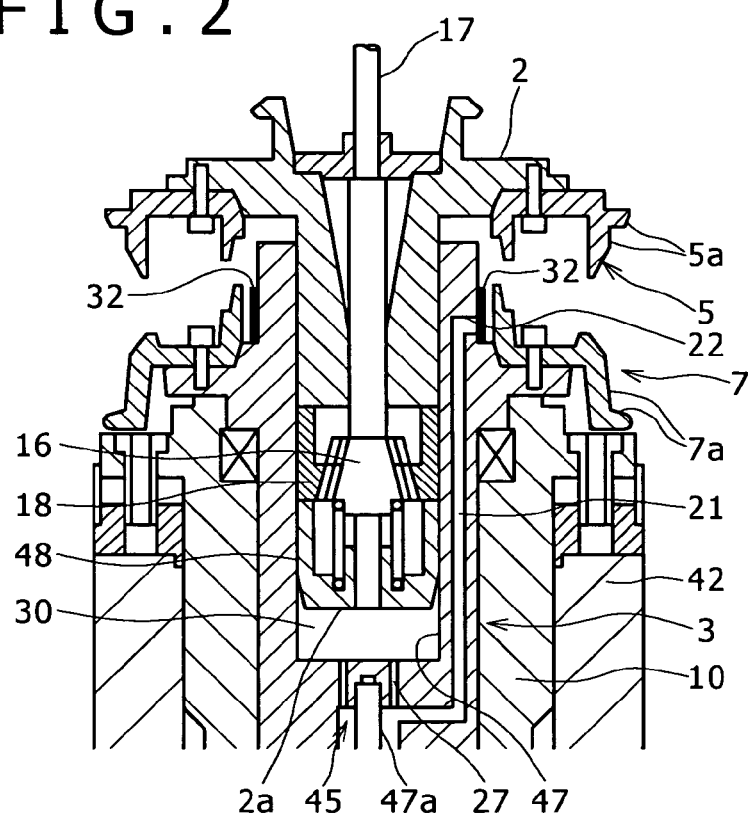
FIG. 2 is a front sectional view of an enlarged principle part showing a state where a plug body of spindle direction engaging means is attached on the tire testing machine in FIG. 1.
Figure 3:
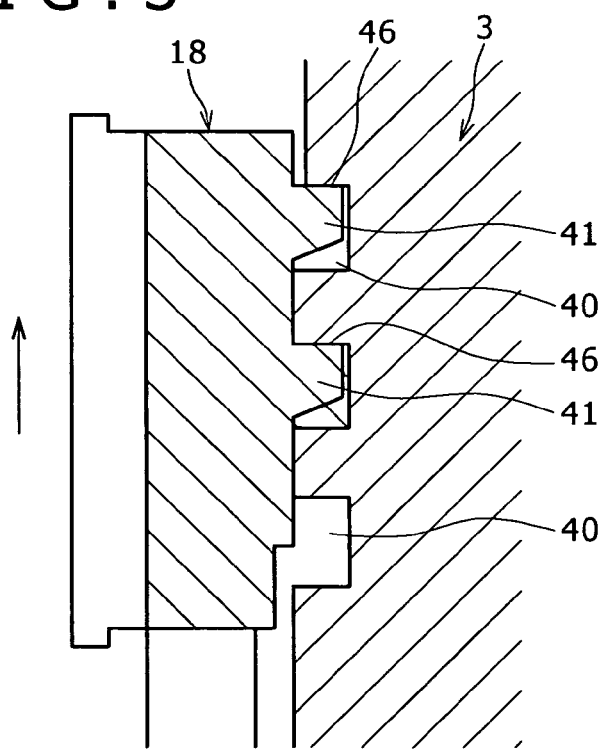
FIG. 3 is a detailed view showing a state where a lock piece is closely engaged with a lower spindle.

FIGS. 1 to 3 show the first embodiment of the tire testing machine 1 according to the present invention.

The tire testing machine 1 includes a tubular first spindle 3 whose one end opens largely, a second spindle 2 which has a columnar exterior, and is contained in the first spindle 3 thorough the opening, and a lock piece 18 which is engaged with the second spindle 2 so as to protrude from and retract into the second spindle 2 in the radial direction. The first spindle 3 and the second spindle 2 are vertically arranged, and relatively move, the first spindle 3 is designated as a lower spindle, and the second spindle 2 is designated as an upper spindle.

An upper rim 5 is fixed by means of bolts 6 to a bottom end portion of the upper spindle 2, and a lower rim 7 is fixed by means of bolts 8 to a top end portion of the lower spindle 3. Positions of the upper rim 5 and lower rim 7 respectively supported by the upper and lower spindles 2 and 3 are center positions of the rotation thereof.

The upper rim 5 and the lower rim 7 are disks in shape which can be respectively in contact with beads on both sides of a tire T, multiple types of them are provided according to the tire size of the tire T, and they are replaced to ones of proper size for each measurement.

The upper spindle 2 can be lifted up and down by a lift cylinder (not shown) or the like, and the upper rim 5 can be caused to approach to/separate from the lower rim 7 supported by the lower spindle 3. Moreover, the upper spindle 2 is maintained so as to horizontally rotate about the rotational center of the tire T as a rotational axis.

In contrast, the lower spindle 3 is held by a device frame 9 and a bearing housing 10 so as to horizontally rotate coaxially with the upper spindle 2 without up/down movements.

The bearing housing 10 is provided inside a spindle housing 42 provided on the device frame 9, and bearings 43 provided between the bearing housing 10 and the lower spindle 3 enable the lower spindle 3 to rotate.

The tire testing machine 1 includes an inflating means 20 which can inflate the tire T mounted on the rims 5 and 7. The inflating means 20 is used to fill the tire T with a pressurized gas (such as air) after the tire T is mounted to and held by the respective upper and lower rims 5 and 7, and includes a tire pressure supply passage 21 which passes through the lower spindle 3.

This tire pressure supply passage 21 passes through the lower spindle 3 from a bottom end to a top end of the lower spindle 3, and a gas outlet 22 is formed radially inside an attached portion of the rim 7 on an upper end side of the tire pressure supply passage 21. The air can be supplied to the inside of the tire T from the gas outlet 22. Moreover, the air is supplied to the tire pressure supply passage 21 below the lower spindle 3 via an air supply pipe 23 from a supply source (not shown).

The lower spindle 3 is formed in a cylindrical shape, and recessed lock portions 40 are provided radially outward from an inner wall of the lower spindle 3 along the entire periphery of the inner wall as shown in FIG. 3. A plurality of the lock portions 40 are provided in the axial direction.

The upper spindle 2 is formed in a tubular shape, and a lock piece 18 which emerges and retracts in the radial direction with respect to the upper spindle 2 is provided on the upper spindle 2. When the upper spindle 2 is contained in the lower spindle 3, this lock piece 18 engages with the lock portions 40 of the lower spindle 3 to prevent the upper spindle 2 and the lower spindle 3 from separating from each other. On an extreme end of the lock piece 18 is provided locked portions 41 in a protruded shape which are locked to/unlocked from the lock portions 40, which provides such a configuration that the locked portions 41 are locked to/unlocked from the lock portions 40 by sliding a base end portion of the lock piece 18 on an outer periphery of a lock wedge 16 in a wedge shape provided in a hollow of the upper spindle 2.

Namely, the lock wedge 16 is moved vertically by a drive shaft 17 provided in the hollow of the upper spindle 2, when the lock wedge 16 is moved downward to slide the base end portion of the lock piece 18 toward the upper side of the lock wedge 16, the lock piece 18 retracts radially inward to separate the locked portions 41 from the lock portions 40 resulting in a unlock state, and when the lock wedge 16 is moved upward to slide the base end portion of the lock piece 18 toward the lower side of the lock wedge 16, the lock piece 18 emerges radially outward to engage the locked portions 41 with the lock portions 40 resulting in a lock state.

On this tire testing machine 1 is provided an spindle direction engaging means 45 which moves the upper spindle 2 in the direction to separate from the lower spindle 3 when the tire is not mounted thereby closely engaging the locked portions 41 of the lock piece 18 and the lock portions 40 of the lower spindle 3 with each other in the spindle direction (axial direction) of the spindle.

It should be noted that the spindle direction engaging means 45 moves at least either one of the upper and lower spindles 2 and 3 toward a mutually separating direction thereby closely engaging the lock piece 18 with the lock portions 40 of the spindle to be engaged in the axial direction of the spindles, both of the upper and lower spindles 2 and 3 may be moved in mutually separating directions, or one of the spindles 2 and 3 may be moved in a mutually separating direction.

Even in the lock state where the locked portions 41 are engaged with the lock portions 40, and protrusions of respective of them are meshed with each other, there is generated a slight play (gap) in the vertical direction due to a manufacturing precision and an operation precision thereof. This play is approximately 0.5 to some millimeters in the vertical direction, which often causes a backlash of ten-odd micro meters in the horizontal direction.

On this occasion, a space 30 is formed between the upper spindle 2 and the lower spindle 3. Namely, in the lock state, a bottom end 2a of the upper spindle 2 and a lower portion 47a of an engaging recess 47 of the lower spindle 3 which is engaged with the upper spindle 2 are separated vertically, and the space 30 is formed therebetween.

The spindle direction engaging means 45 includes a pressing force supply passage 27 which supplies the space 30 with a gas.

This pressing force supply passage 27 is used to supply the space 30 with the gas, branches from a middle portion of the tire pressure supply passage 21, and communicates with the space 30.

As a result, when the gas is supplied from the supply source to the tire pressure supply passage 21, the gas flows to the pressing force supply passage 27 branching from the tire pressure supply passage 21, and is supplied to the space 30 via the pressing force supply passage 27.

The spindle direction engaging means 45 includes a plug body 32 (shown in FIG. 2) which is detachable from the gas outlet 22 of the tire pressure supply passage 21. The plug body 32 is used to forcefully supply the pressing force supply passage 27 with the gas supplied by the tire pressure supply passage 21 when the tire T is not mounted, for example.

The plug body 32 is formed as a cylindrical shape, for example, is externally engaged with an upper cylindrical portion of the lower spindle 3, and there are provided ring seals such as O rings on the plug body 32 above and below an opening of the gas outlet 22 to close the gas outlet 22.

When the gas is supplied to the tire pressure supply passage 21 while the plug body 32 is attached to the gas outlet 22, the gas flowing through the tire pressure supply passage 21 flows into the pressing force supply passage 27 which branches from the tire pressure supply passage 21, and is supplied to the space 30 via the pressing force supply passage 27.

On this occasion, the upper spindle 2 moves upward in the axial direction thereof, namely the mutually separating direction, due to the pressure of the gas which has entered the space 30.

As shown in FIG. 2, an O ring 48 is provided as a seal in a ring shape below the upper spindle 2. The O ring 48 is used to air-tightly seal the space 30, is disposed between the upper spindle 2 and the lower spindle 3 when the upper spindle 2 is engaged with the lower spindle 3, and is closely contact at an outer peripheral surface thereof with an inner wall of the lower spindle 3.

It should be noted that the ring-shape seal may be provided so as to be in closely contact with a peripheral wall of the engaging recess 47 of the lower spindle 3 and an extreme end surface of the upper spindle 2.

A description will now be given of a method for using the tire testing machine 1 with the above-described configuration, and a method for measuring a run out of the rims 5 and 7 of the tire testing machine 1.

First, the plug body 32 of the spindle direction engaging means 45 is attached to the gas outlet 22 of the inflating means 20 provided on the lower spindle 3 as shown in FIG. 2. Moreover, the upper rim 5 is attached to the upper spindle 2, the lower rim 7 is attached to the lower spindle 3, the upper spindle 2 is moved down while the tire T is not mounted and maintained, and the upper spindle 2 and the lower spindle 3 are locked by the lock piece 18.

In this state, the gas is supplied to the tire pressure supply passage 21 of the lower spindle 3 via the air supply pipe 23 of the inflating means 20. Then, since the gas cannot be blown out from the gas outlet 22, the gas is blown out in the space 30 via the pressing force supply passage 27, and pushes up the upper spindle 2 as described above.

Consequently, the upper spindle 2 is separated upward with respect to the lower spindle 3, contact surfaces 46 (contact portions) in the spindle direction (axial direction of the spindle) of the locked portions 41 of the lock piece 18 and the lock portions 40 of the lower spindle 3 are closely contact with each other, the slight play (gap) in the spindle direction mechanically generated between the locked portion 41 and the lock portion 40 is consequently eliminated, and a stable state without a backlash is brought about between the upper and lower spindles 2 and 3.

This stable state is a pseudo inflated state which can be considered as the same as a state where the tire T is mounted on and held by the upper and lower rims 5 and 7 attached to the upper and lower spindles 2 and 3, and the tire T is further inflated by the pressurized gas.

A dial gauge (not shown) is brought in contact with a bead seat surface 5a (surface to be brought in contact with the bead of the tire T) of the upper rim 5 or a bead seat surface 7a of the lower rim 7 in this state, and accuracy measurement relating to the surface run out, the axial run out, and the like of the upper and lower spindles 2 and 3 are carried out while the upper and lower spindles 2 and 3 are being rotated.

As the above description shows, the measurement method for the axial run out of the rims is carried out by supplying the space 30 formed between the upper spindle 2 and the lower spindle 3 with the gas when the lock piece 18 is engaged with the lower spindle 3, moving the upper spindle 2 in the mutually separating direction to bring the lock piece 18 and the upper spindle 2 in close contact with each other, and then measuring the run outs of the rims 5 and 7.

It should be noted that positional accuracies may be measured by bringing the dial gauge in contact with proper positions on the upper and lower spindles 2 and 3 while the upper rim 5 and the lower rim 7 are not attached to the upper and lower spindles 2 and 3.

Based on the measured results, an adjustment is properly carried out on the device. If the adjustment cannot be carried out on the device, or a displacement is not large enough for the device to adjust, the above measured result may be reflected as correction values to the tire uniformity measurement of the tire T to be carried out subsequently.

The supply of the air by the inflating means 20 is then stopped, the upper spindle 2 is moved up, the plug body 32 attached to the lower spindle 3 is detached, the tire T is mounted according to a procedure, and uniformities of the tire T are measured.

Figure 4:
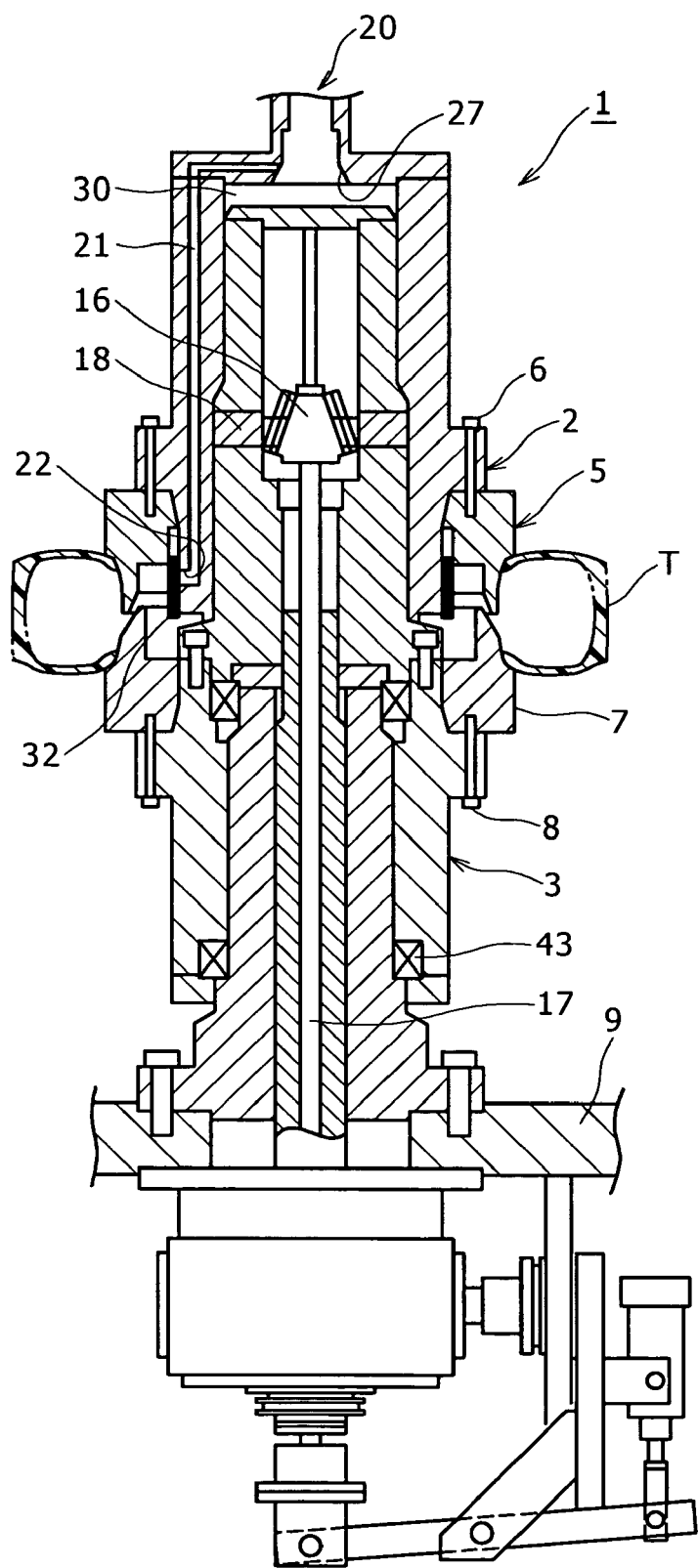
FIG. 4 is a front cross sectional view of a variation of the tire testing machine according to the first embodiment of the present invention.

FIG. 4 shows a variation of the tire testing machine 1 according to the present invention. While the upper spindle 2 is contained in the lower spindle 3 according to the above embodiment, the lower spindle 3 is contained in the upper spindle 2 in the tire testing machine 1 according to this variation. Namely, the present embodiment is different from the above embodiment in that the engagement of the upper and lower spindles 2 and 3 are vertically inversed.

Moreover, the lock piece 18 is provided so as to radially protrude from and retract into the lower spindle 3 accordingly, and the lock portions 40 are provided on the inner wall of the upper spindle 2.

Because of this difference in the configuration, the tire pressure supply passage 21 of the inflating means 20 is provided for the upper spindle 2, and the spindle direction engaging means 45 (configuration that the pressing force supply passage 27 is connected to a middle portion of the tire pressure supply passage 21, and the plug body 32 which closes the gas outlet 22 of the tire pressure supply passage 21 is detachably provided) is also provided for the upper spindle 2.

As a result, if the plug body 32 is attached to the gas outlet 22 in the spindle direction engaging means 45, and the gas is supplied to the tire pressure supply passage 21 of the inflating means 20, the gas is blown out in the space 30 via the pressing force supply passage 27, and pushes up the upper spindle 2.

As a result, the contact surfaces (contact portions) in the spindle direction of the locked portions 41 of the lock piece 18 and the lock portions 40 of the lower spindle 3 are brought into close contact, and a slight play (gap) in the spindle direction mechanically generated between the locked portions 41 and the lock portions 40 is eliminated, and a stable state without a backlash is brought about between the upper and lower spindles 2 and 3.

These effects are basically approximately the same as those of the above embodiment.

The present invention is not limited to the above respective embodiments, and can be properly changed according to a mode of application. For example, the plug body 32 used as the spindle direction engaging means 45 is not limited to be formed as a plate, and may be any shape such as a plug shape as long as it can close the gas outlet 22.

Moreover, an open-close valve, which is not shown, may be used in place of the plug body 32 for the spindle direction engaging means 45. In this case, the open-close valve may be provided at a proper position between the connection of the pressing force supply passage 27 to the tire pressure supply passage 21 of the inflating means 20 and the gas outlet 22 of the tire pressure supply passage 21.

In this case, the open-close valve may be manually opened/closed or may be opened/closed automatically and mechanically by means of remote control or the like. The vertical arrangement of the rims 5 and 7 is not limited, and the rims 5 and 7 may be arranged to horizontally oppose to each other. Further, detailed configurations of the tire testing machine can be properly changed.

Namely, the tire testing machine according to the first embodiment that includes the first tubular spindle that comprises one of the pair of rims, the columnar second spindle that comprises the other one of the pair of rims, and is contained in the first spindle, the lock portions that are provided on the peripheral wall of either one of the first and second spindles, and the lock piece that is provided on the other one of the first and second spindles to engage with the lock portions thereby preventing the first and second spindles from separating from each other, comprises the spindle direction engaging means that causes the lock piece and the lock portions in the engaged state to be brought in close contact with each other in the axial direction of the spindles by relatively separating the both spindles when a tire is not mounted on the rims, and the lock piece is engaged with the lock portions.

According to the tire testing machine of the first embodiment, the adjustment can be carried out on the device to increase the mechanical precision before a tire is mounted, and the rims are attached, resulting in highly accurate results in the measurement of the various tire uniformities of a tire.

Namely, according to the first embodiment, since the spindle direction engaging means is caused to move the first spindle and the second spindle in the mutually separating directions, thereby closely engaging the lock piece and the lock portions each other in the spindle direction (axial direction) of the spindle when the lock piece is engaged with the lock portions, it is possible to realize the same state without mounting a tire (pseudo inflated state) as a conventional state where a tire is mounted and is inflated, to eliminate a mechanical play (gap) included in the engagements, and to bring the either one of the spindles in a stable state without a backlash. Therefore, a measurement of the positional accuracy of the spindles in this stable state can be considered as the mechanical precision of the tire testing machine, which can be used to properly adjust the device, or can be recognized as a correction value applied to measured data (can be reflected to the measured results of the tire).

It should be noted that, according to the first embodiment, the spindle direction engaging means preferably includes the pressing force supply passage which supplies the space formed between both the spindles with the gas while the lock piece is engaged with the lock portions.

With this configuration, both the spindles can be moved in the separating directions by supplying the space between both the spindles formed as a result of the engagement of the lock piece with the lock portions with the gas, and the lock piece can be brought into the lock state, which is approximately the same as the conventional tire inflated state, by adjusting the pressure of the gas, namely the first spindle and the second spindle 2 are brought to positions approximately the same as positions when the tire is inflated.

Moreover, according to the first embodiment, the pressing force supply passage preferably branches from the tire pressure supply passage used to inflate a tire, and the spindle direction engaging means preferably includes the plug body which forcefully feeds the gas supplied to the tire pressure supply passage to the pressing force supply passage.

According to this configuration, it is possible to supply the space with the pressure by feeding the gas to the tire pressure supply passage when a tire is not mounted. Moreover, since the pressing force supply passage branches from the tire pressure supply passage, the configuration can be simplified.

Further, according to the first embodiment, the spindle direction engaging means preferably has the ring-shape seal used to air-tightly seal the space between the first spindle and the second spindle.

Since the space can be sealed airtight by the ring-shape seal, it is possible to more surely move the first spindle and the second spindle in the mutually separating directions (axial direction of the spindle) by means of the gas pressure. Moreover, the space is airtight, it is possible to maintain the state, which is approximately the same as the tire-inflated state, for a long period.

Moreover, the run out measuring method of the tire testing machine according to the first embodiment engages the lock piece and the lock portions with each other, supplies the space formed between the first spindle and the second spindle with the gas, moves at least either one of the spindles in the mutually separating direction by means of the supplied gas to bring the lock piece and the lock portions in close contact with each other in the axial direction of the spindles, and then measures the run outs of the rims without tire being mounted.

According to this method, it is possible to realize the state, which is the same as the conventional state where a tire is inflated, without mounting a tire to measure the run outs of the rims in this state, and to properly adjust the tire testing machine based on the measurements.

A description will now be given of a tire testing machine 50 according to a second embodiment of the present invention with reference to FIGS. 5 to 15.

Figure 5:
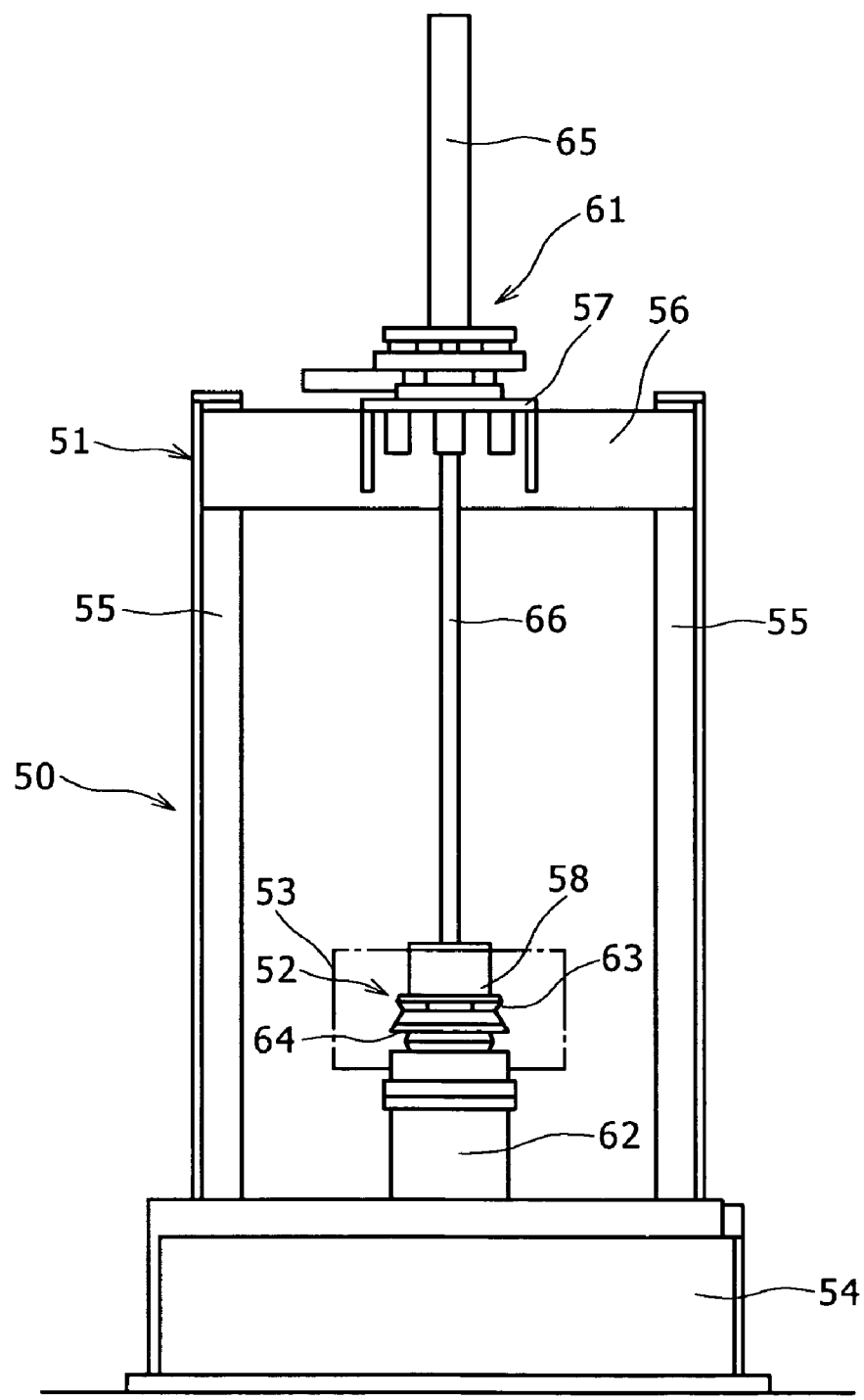
FIG. 5 is an overall front view of a tire testing machine according to a second embodiment of the present invention.
Figure 6:
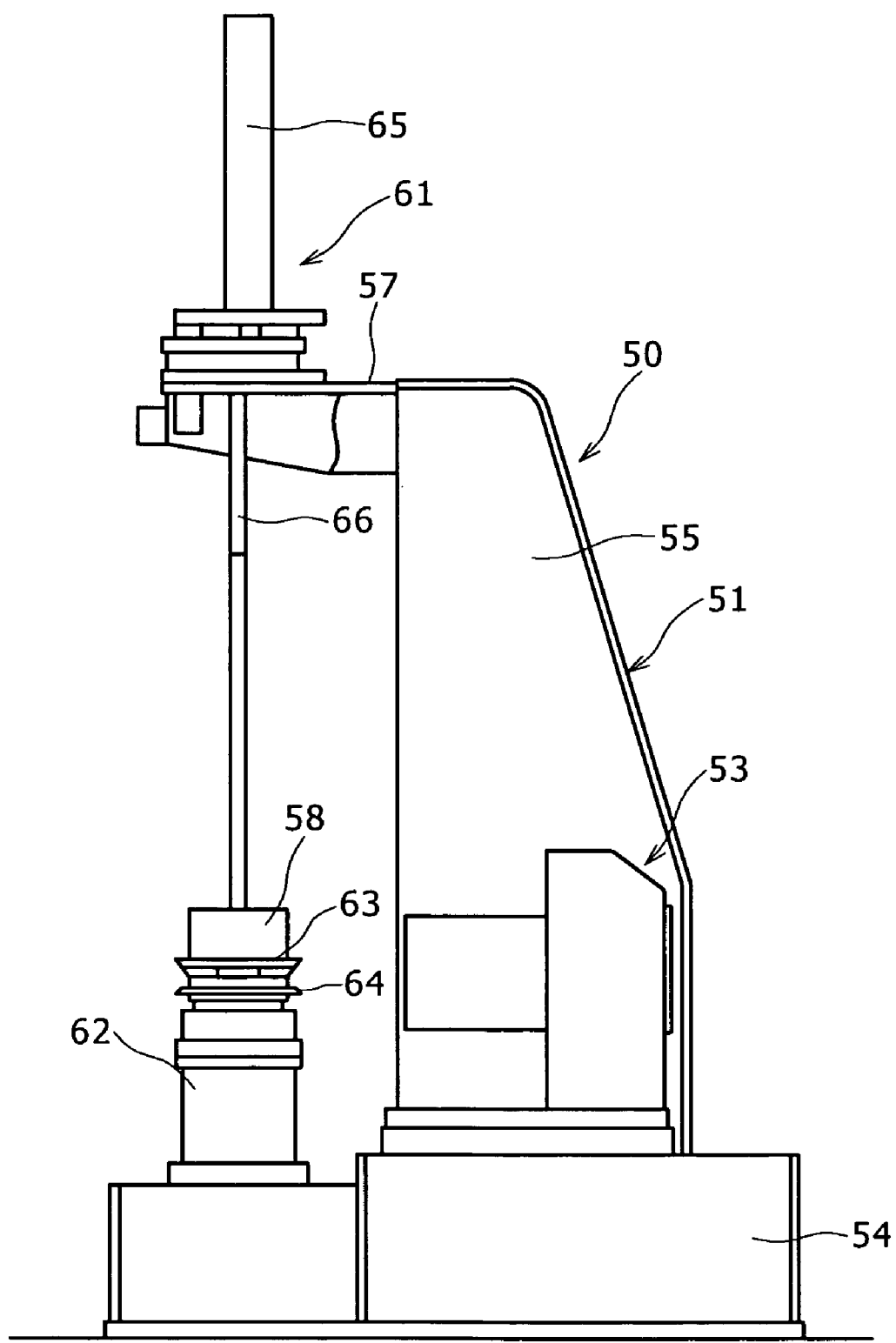
FIG. 6 is an overall side view of the tire testing machine in FIG. 5.
Figure 7:
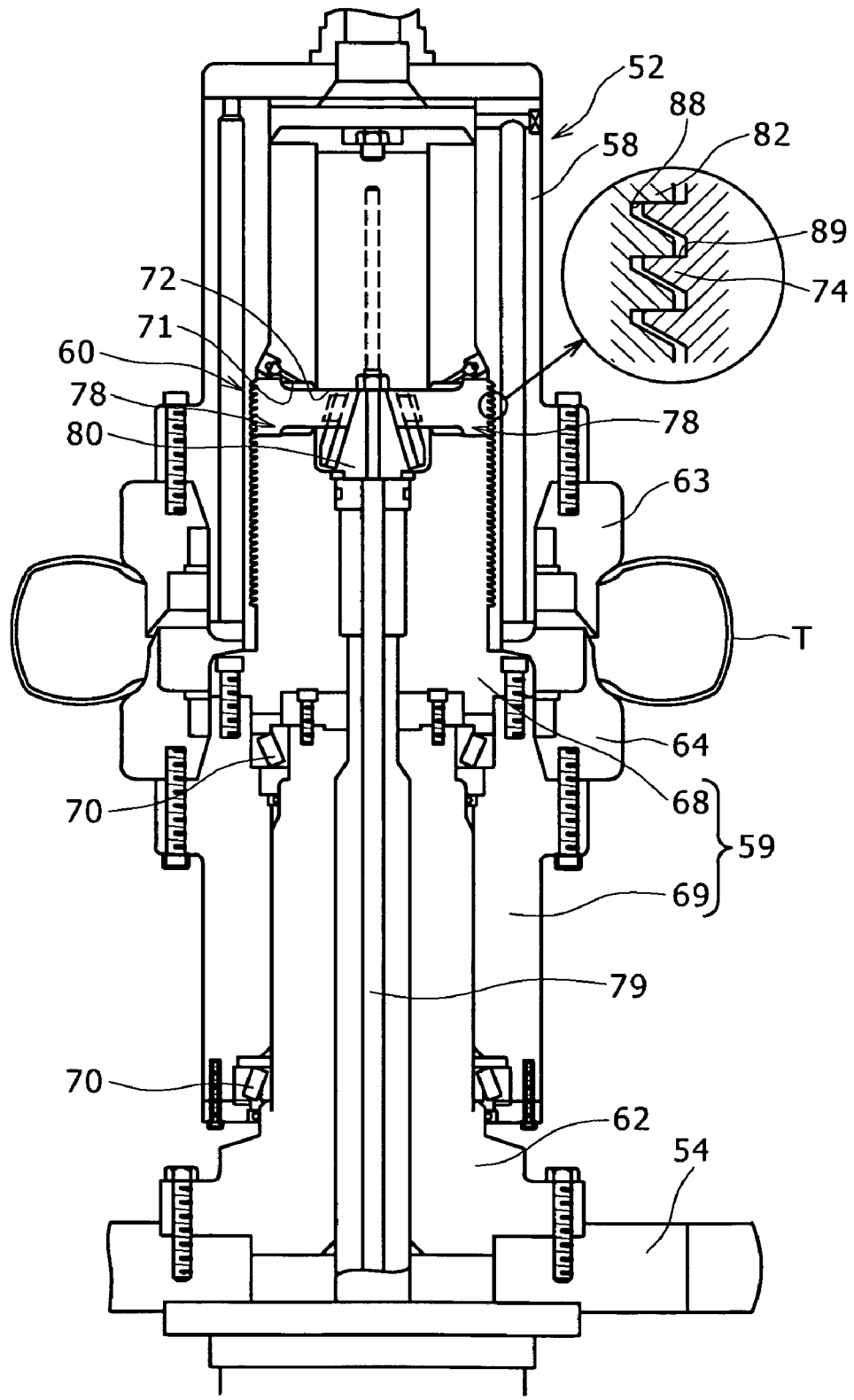
FIG. 7 is a detailed view of a spindle device.

FIG. 5 shows an overall front view of the tire testing machine 50, and FIG. 6 shows an overall side view of the tire testing machine 50. FIG. 7 shows a detailed view of a spindle device provided for the tire testing machine 50.

It should be noted that the left/right direction of the page is the left/right direction, and the direction passing trough the page is the front/rear direction in FIG. 5, and the left/right direction of the page is the front/rear direction, and the direction passing trough the page is the left/right direction in FIG. 6.

As shown in FIGS. 5 to 7, the tire testing machine 50 includes a main frame 51 and a spindle device 52 which is supported by the main frame 51, and detachably mounts the tire T. Moreover, the tire testing machine 50 includes a drum device 53 which applies a rotation and a load on the tire T mounted on the spindle device 52.

The main frame 51 includes a base 54 including a hollow stand in approximately a rectangular shape, and a pair of left and right pillars 55 vertically erected on left and right sides on the base 54. Moreover, the main frame 51 includes an upper beam 56 bridging between top ends of the pillars 55, and an upper plate 57 protruded forward as a cantilever from a center portion of the upper beam 56.

The spindle device 52 is disposed at the center in the left/right direction, and on the front side in the front/rear direction in the main frame 51.

This spindle device 52 includes a tubular first spindle 58, a second spindle 59 with a columnar exterior contained in the first spindle 58, and a lock piece 60 which is engaged with the second spindle 59 so as to protrude from and retract into the second spindle 59. The first spindle 58 and the second spindle 59 are engaged with each other for a relative movement.

The first spindle 58 includes an upper spindle which is supported for moving vertically by a lift device 61 fixed to an upper portion of the main frame 51.

The second spindle 59 includes a lower spindle supported by a spindle post 62 which is fixed on the base 54 of the main frame 51, and protrudes upward.

The upper spindle 58 includes one of a pair of rims 63 and 64 used to mount the tire T, and the lower spindle 59 includes the other one of the pair of rims 63 and 64.

The lift device 61 includes a lift cylinder 65 which is vertically erected on the upper plate 57 of the main frame 51, and a lift rod 66 which passes through the lift cylinder 65 so as to vertically emerge from and retract into a bottom end of the lift cylinder 65. An upper portion of the upper spindle 58 is connected to a lower portion of the lift rod 66, and the upper spindle 58 is externally engaged with the lower spindle 59 as the lift rod 66 moves upward and downward.

The spindle post 62 is formed as a tubular shape, and erects upward from the base 54.

The lower spindle 59 is formed by connecting two tubes in the middle in the vertical direction, and includes an upper tube portion 68 and a lower tube portion 69.

The lower tube portion 69 of the lower spindle 59 is externally engaged with the spindle post 62. The lower tube portion 69 is supported for rotation with respect to the spindle post 62 by spindle bearings 70 which are separated vertically, and are disposed against the spindle post 62.

The upper and lower tube portions 68 and 69 and the upper spindle 58 are disposed coaxially.

Figure 8:
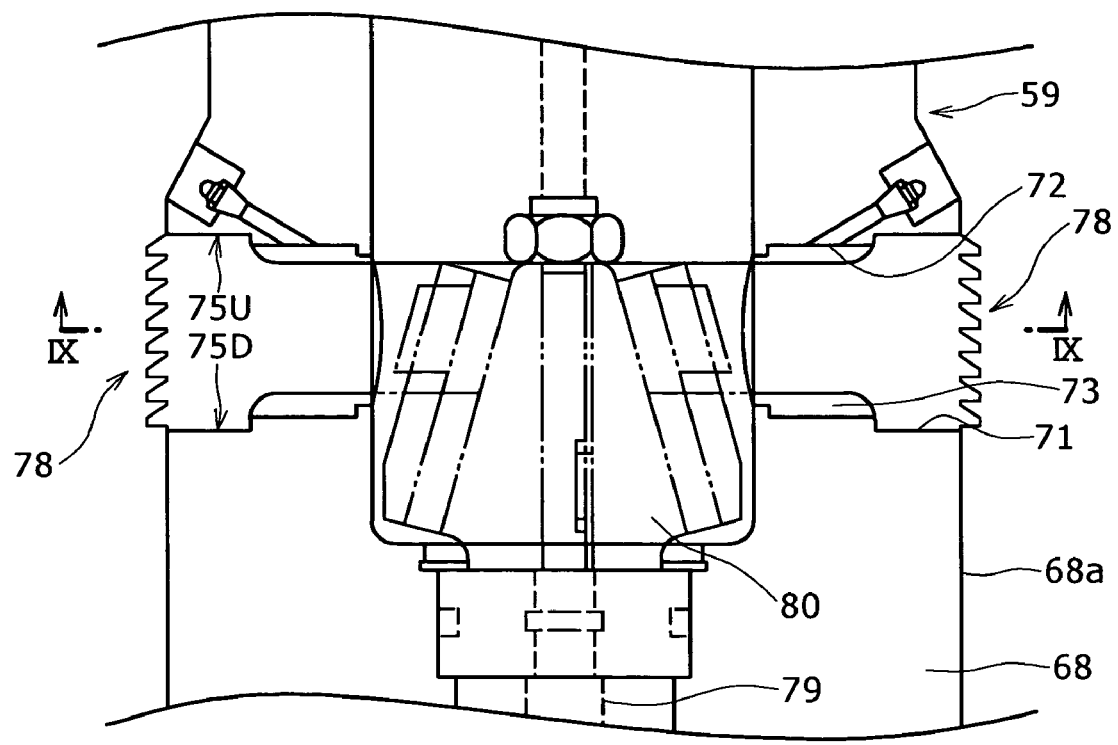
FIG. 8 is a detailed view of the shape of a lower spindle.
Figure 9:
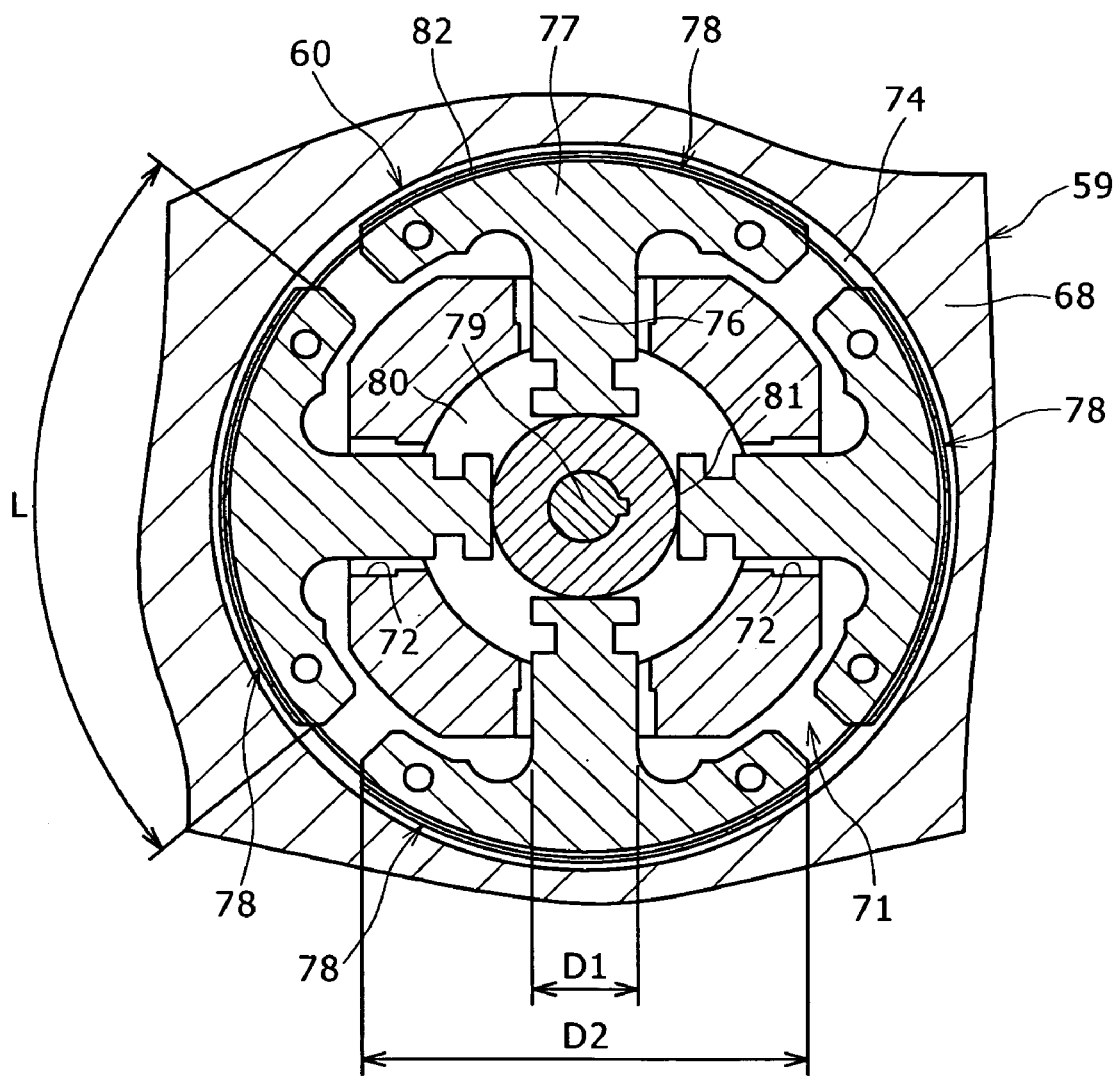
FIG. 9 is a cross sectional view made on a plane and in a direction indicated by IX in FIG. 8.
Figure 10:
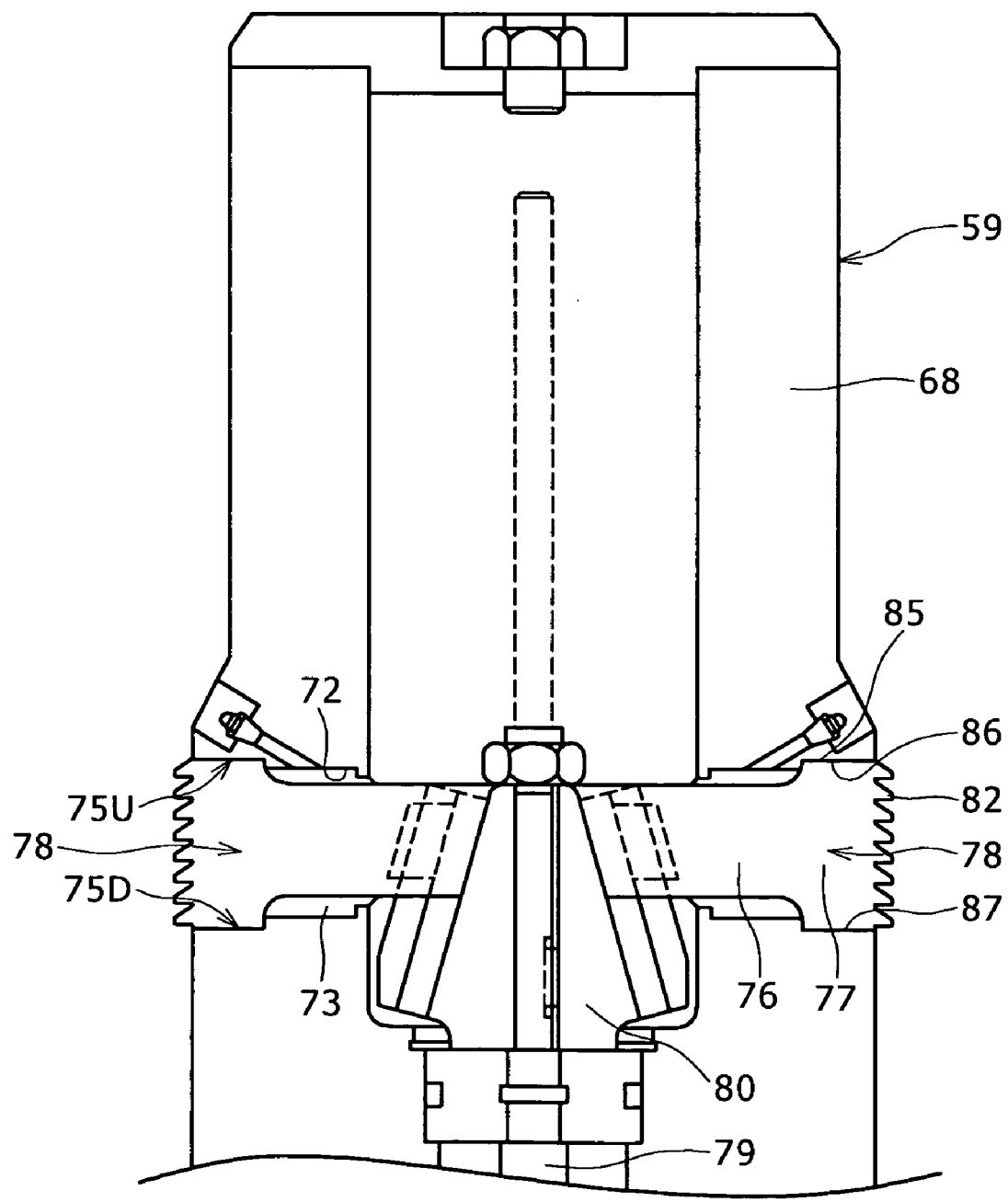
FIG. 10 is a view showing a relationship between a lock piece and the lower spindle.

As shown in FIGS. 8 to 10, on an upper portion of the lower spindle 59, namely an outer periphery of the upper tube portion 68 is provided a cut groove 71 which extends along the entire outer periphery, and is cut radially inward. Circular through holes 72 which pass through radially inward are provided on a radially inner wall of the cut groove 71. The through holes 72 are provided at an interval of 90 degrees, and a bush 73 is engaged with the respective through holes 72.

Upper and lower wall surfaces 75U and 75D of this cut groove 71 are flat surfaces orthogonal to the spindle direction of the lower spindle 59.

The upper spindle 58 is formed as a tubular shape, and along an entire periphery on an inner wall of the upper spindle 58 are provided lock portions 74 (refer to FIG. 7) including recessed grooves in an inner wall direction (radially outward). A plurality of the lock portions (grooves) 74 is provided from a middle portion to a lower portion in the vertical direction on the upper spindle 58.

The lock piece 60 is formed approximately as T shape, and includes a support portion 76 which is inserted into and engaged with the through hole 72 provided in the lower spindle 59, and an extreme end portion 77 which is provided on an extreme end of the support portion 76, and includes upper and lower surfaces formed as flat surfaces, and the upper and lower surfaces 86 and 87 of the extreme end portion 77 are in sliding contact with upper and lower wall surfaces 75U and 75D of the cut groove 71.

The support portion 76 is formed as a bar shape with a circular cross section, and is moves with respect to the through hole 72 in a direction orthogonal to the axial center of the lower spindle 59.

The upper and lower surfaces 86 and 87 of the extreme end portion 77 slide on sliding surfaces (contact surfaces) against the upper and lower wall surfaces 75U and 75D of the cut groove 71. Namely, the upper and lower wall surfaces 75U and 75D of the cut groove 71 and the upper and lower surfaces 86 and 87 of the extreme end portion 77 are formed so as to be in sliding contact with each other.

The lock piece 60 is formed as four independent lock bodies 78, and the respective lock bodies 78 include the support portion 76 and the extreme end portion 77.

The lock piece 60 includes an arc outer periphery concentric with the lower spindle 59, and the outer periphery is formed so as to radially protrude and retract as the lock bodies 78 move.

A base portion of the support portion 76 is slidingly engaged with a switching member 80 supported for moving vertically via an operation rod 79 in the lower spindle 59.

The switching member 80 is formed as a lock wedge in approximately a truncated cone shape whose outer periphery extends from an upper portion to a lower portion. On an outer peripheral surface of the lock wedge 80 are formed slide slots 81 in a T slot shape in the vertical direction. The engaging portion in T shape formed on the support portion 76 slides in the slide slot 81.

Thus, when the lock wedge 80 is moved upward, the lock wedge 80 pushes the support portions 76 radially outward to protrude the extreme end portions 77 of the lock pieces 60 radially outward from the outer peripheral surface 68a of the upper tubular portion 68, thereby engaging the extreme end portions 77 of the lock pieces 60 and the lock portions 74 with each other. On this occasion, the extreme end portions 77 of the lock pieces 60 protrude from the cut groove 71 radially outward. In the following description, this protruding state is referred to as lock state.

On the other hand, when the lock wedge 80 is moved downward, the lock wedge 80 pulls the support portions 76 radially inward to retract the extreme end portions 77 of the lock pieces 60 radially inward from the outer peripheral surface 68a of the upper tubular portion 68, thereby disengaging the extreme end portions 77 of the lock pieces 60 and the lock portions 74 from each other. On this occasion, the extreme end portions 77 of the lock pieces 60 stay in the cut groove 71. In the following description, this state is referred to as retracted (unlock) state.

The extreme end portion 77 of the lock piece 60 is formed as an arc shape extending along the lock portions 74 of the upper spindle 58 in the peripheral direction. The width D2 in the peripheral direction of the extreme end portion 77 of the lock piece 60 is set larger than the width D1 in the peripheral direction of the support portion 76.

The extreme end portion 77 of the lock piece 60 includes locked portions 82 to be locked to the lock portions 74, and the locked portions 82 are constituted by forming the outer peripheral surface of the extreme end portion 77 into a protruded shape. The protruded portions 82 are formed on an almost entire area in the peripheral direction of the extreme end portions 77 of the lock pieces 60, and a plurality of them are provided in the vertical direction.

When the lock piece 60 including the four lock bodies 78 is retracted in the lower spindle 59, the extreme end portions 77 thereof are aligned with approximately the entire outer periphery of the lower spindle 59, and when the lock piece 60 are protruding from the lower spindle 59 in the lock state, the extreme end portions 77 thereof are locked to approximately the entire periphery of the lock portions 74.

Namely, the sum of the length L of the arc of the extreme end portion 77 of the four lock bodies 78 is approximately the same as the length of an outer peripheral circle of the upper tube portion 68 of the lower spindle 59 on which the cut groove 71 is formed. The outer periphery of the lock piece 60 is formed to provide the above configuration.

With this configuration, when the lock piece 60 is in the retracted state, the lock piece 60 is stored in the cut groove 71 (in other words, the outer peripheries of the extreme end portions 77 of the lock piece 60 are positioned inside approximately the entire periphery of the outer periphery of the lower spindle 59), when the lock piece 60 is in the lock state, the lock piece 60 can be locked to approximately the entire periphery of the lock portions 74 provided on the upper spindle 58, and contact areas of the extreme end portions 77 of the lock piece 60, namely the protruded portion 82, and the lock portions 74 are maximized.

It should be noted that it is necessary to provide a predetermined gap between the lock bodies 78 such that when the lock bodies 78 neighboring in the peripheral direction do not interfere with each other when the lock piece 60 is in the retracted state.

Moreover, the gap between the neighboring lock bodies 78 can be reduced as much as possible by reducing the movement of the lock bodies 78 between the lock state and the retracted state as much as possible, and this can increase the length in the peripheral direction of the can extreme end portions 77 of the lock pieces 60 as much as possible, and increase the contact areas between the upper and lower surfaces 86 and 87 of the extreme end portions 77 and the upper and lower wall surfaces 75U and 75D of the cut groove 71. With this configuration, the contact areas of the lock portion 74 and the locked portion 82 can be increased as much as possible.

When the upper spindle 58 and the lower spindle 59 are locked by the lock piece 60, and the tire T is filled with air, an upward force is applied on the upper spindle 58, a downward force is applied on the lower spindle 59, and separating forces are generated between the upper spindle 58 and the lower spindle 59.

The separating forces are received by the locked portions 82 of the lock piece 60 and the lock portions 74 of the upper spindle 58, and since the contact areas thereof are large as described above, the surface pressure applied to respective of them can be reduced as much as possible.

In the lock state brought about by the lock piece 60, when the separating forces act on the upper spindle 58 and the lower spindle 59, the lower spindle 59 and the lock piece 60 also receive the separating forces. On this occasion, contact areas of the extreme end portions 77 of the lock piece 60 and the cut groove 71 of the lower spindle 59 serve as receiving portions 85 which receive the separating forces.

In this case, the upper surface side of the lock piece 60 and the upper wall 75U of the cut groove 71 of the lower spindle 59 receive the separating forces, and, in more detail, the flat upper surfaces 86 of the extreme end portions 77 of the lock piece 60 and the flat upper wall 75U of the cut groove 71 are the receiving portions 85 which receive the separating forces.

As appreciated from the above description, the upper surfaces 86 of the extreme end portions 77 of the lock piece 60 and the upper wall surface 75U of the cut groove 71 are formed as flat surfaces orthogonal to the spindle direction of the lower spindle 59, and when the separating forces are applied, a surface contact in a wide area occurs between the upper surfaces 86 (receiving portions 85) of the extreme end portions 77 and the upper wall 75U (receiving portion 85) of the cut groove 71.

Namely, the contact areas of the mutual receiving portions 85 are practically large thereby reducing the surface pressure applied on the upper surfaces 86 of the extreme end portions 77 of the lock piece 60 and the upper wall surface 75U of the cut groove 71, resulting in an increase of the strength against the separating forces of the lock piece 60 and the lower spindle 59 by a reduced amount of the surface pressure, and, consequently, even if the separating forces are repeatedly applied to the lock piece 60 and the cut groove 71 of the lower spindle 59 for a long period, a damage of the lock piece 60 is prevented, and wears of the cut groove 71 and the through holes 72 of the lower spindle 59 are hardly generated.

It should be noted that the lower surfaces 87 of the extreme end portions 77 of the lock piece 60 and the lower wall surface 75D of the cut groove 71 are formed as the flat surfaces approximately orthogonal to the spindle direction of the lower spindle 59, and the upper and lower surfaces 86 and 87 of the extreme end portions 77 of the lock piece 60 are in contact with the upper and lower wall surfaces 75U and 75D of the cut groove 71 when the lock piece 60 is engaged with the lower spindle 59.

Moreover, since the width D2 in the peripheral direction of the extreme end portion 77 of the lock piece 60 is set wider than the width D1 of the peripheral direction of the support portion 76, the width in the peripheral direction of the receiving portion 85 of the extreme end portion 77 of the lock piece 60 is surely wider than the width D1 of the support portion 76.

As shown in FIG. 7, the lower surfaces 88 of the locked portions 82 of the extreme end portions 77 are formed as flat surfaces approximately orthogonal to the spindle direction of the lower spindle 59, and the upper surfaces 89 of the lock portions 74 of the upper spindle 58 are formed as flat surfaces approximately orthogonal to the spindle direction of the lower spindle 59.

Thus, when the separating forces are received by the upper and lower surfaces 88 and 89 of the locked portions 82 and the lock portions 74, they can be brought in contact with each other on the planes approximately orthogonal to the axial center of the upper and lower spindles 58 and 59, and it is thus possible to prevent the upper spindle 58 from being horizontally slipped out or tilted when the separating forces are applied.

Namely, when the separating forces are received, it is possible to prevent a displacement between the axes of the lower spindle 59 and the upper spindle 58 thereby reducing a run out between the upper and lower rims 63 and 64.

Figure 11:
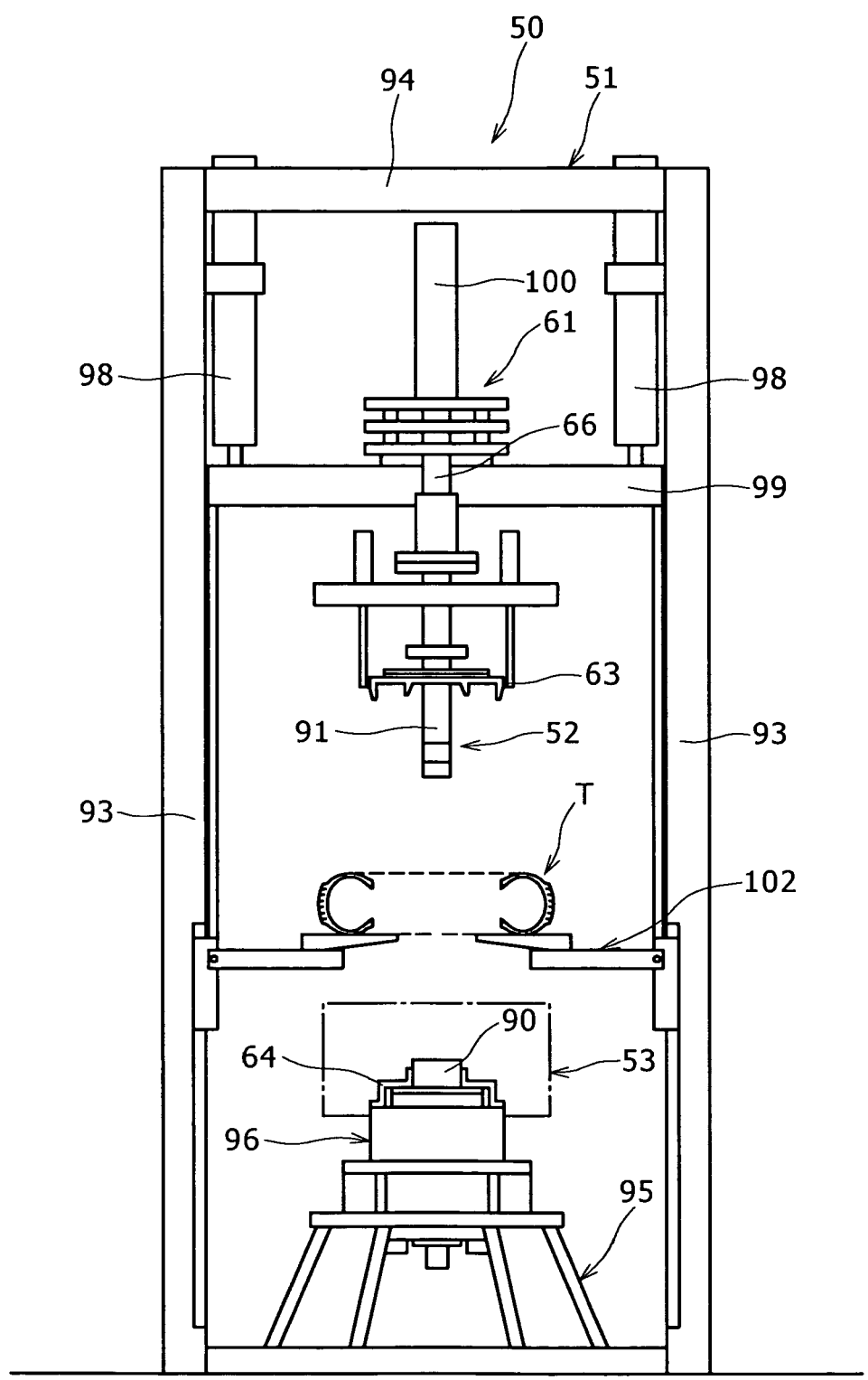
FIG. 11 is an overall front view of a variation of the tire testing machine according to the second embodiment of the present invention.
Figure 12:
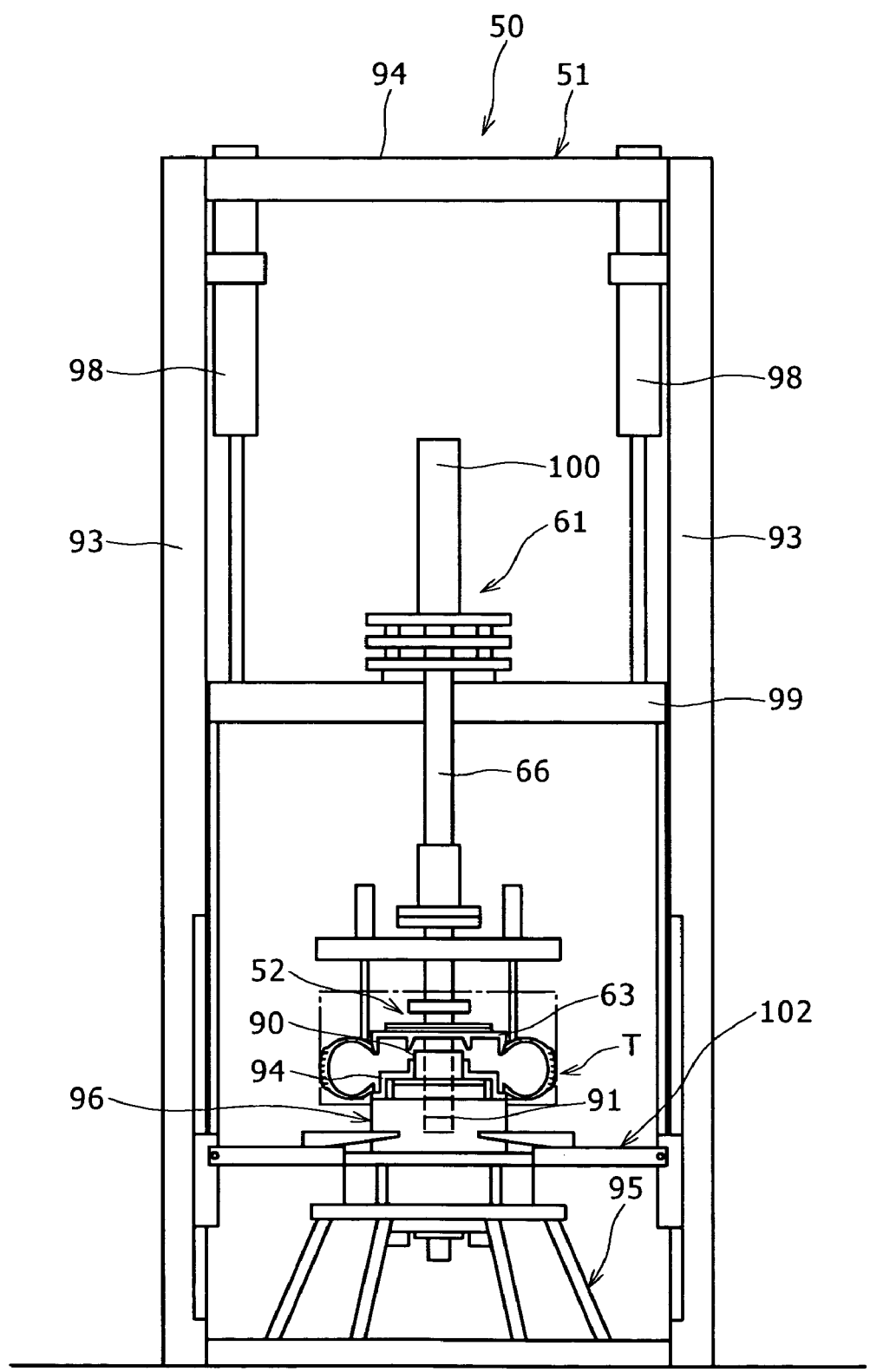
FIG. 12 is a front view when a tire is mounted on rims.

FIGS. 11 and 12 show an overall front view of the tire testing machine 50 according to a variation of the second embodiment. This tire testing machine 50 is different from the above embodiment in the configuration or the shape of the main frame, the first spindle, the second spindle, and the lock piece.

The tire testing machine 50 according to the variation of the second embodiment includes the main frame 51 and the spindle device 52 which is supported by the main frame 51, and detachably mounts the tire T. Moreover, the tire testing machine 50 includes the drum device 53 which applies a rotation and a load on the tire T mounted on the spindle device 52.

The main frame 51 includes pillars 93 which are erected from an installation surface on front and rear, and left and right, and connection bars 94 which connect top ends and bottom ends of the front and rear, and left and right pillars 93. A mounting table 95 used to mount the spindle device 52 is provided inside a frame enclosed by the front and rear, and left and right pillars 93 of the main frame 51.

This spindle device 52 includes a tubular first spindle 90, a second spindle 91 with a columnar (bar-shape) exterior contained in the first spindle 90, and the lock piece 60 which is engaged with the second spindle 91 so as to protrude from and retract into the second spindle 91. The first spindle 90 and the second spindle 91 are engaged with each other for a relative movement.

The first spindle 90 is constituted by a lower spindle which is supported by a housing 96 erected upward from the mounting table 95 of the main frame 51.

The second spindle 91 is constituted by an upper spindle which is supported for moving vertically by the lift device 61 fixed to an upper portion of the main frame 51.

The upper spindle 91 includes one of the pair of rims 63 and 64 used to mount the tire T, and the lower spindle 90 includes the other one of the pair of rims 63 and 64.

The lift device 61 includes a pair of side lift cylinders 98 which are supported by the pillars 93 of the main frame 51, a center frame 99 which connects the left and right side lift cylinders 98, and a center lift cylinder 100 supported by the center frame 99, and the lift rod 66 which passes through the center cylinder 100 for vertically emerging and retracting.

A lower portion of the upper spindle 91 is connected to a lower portion of the lift rod 66, and the upper spindle 91 is contained in the lower spindle 90 as the lift rod 66 moves upward and downward.

A tire loading table 102 is connected to the both left and right ends of the center frame 99 which is operationally connected with up/down of the center frame 99, and the tire loading table 102 moves down and places the tire T on the rim 64 provided on the lower spindle 90 when the center frame 99 moves down.

Figure 13:
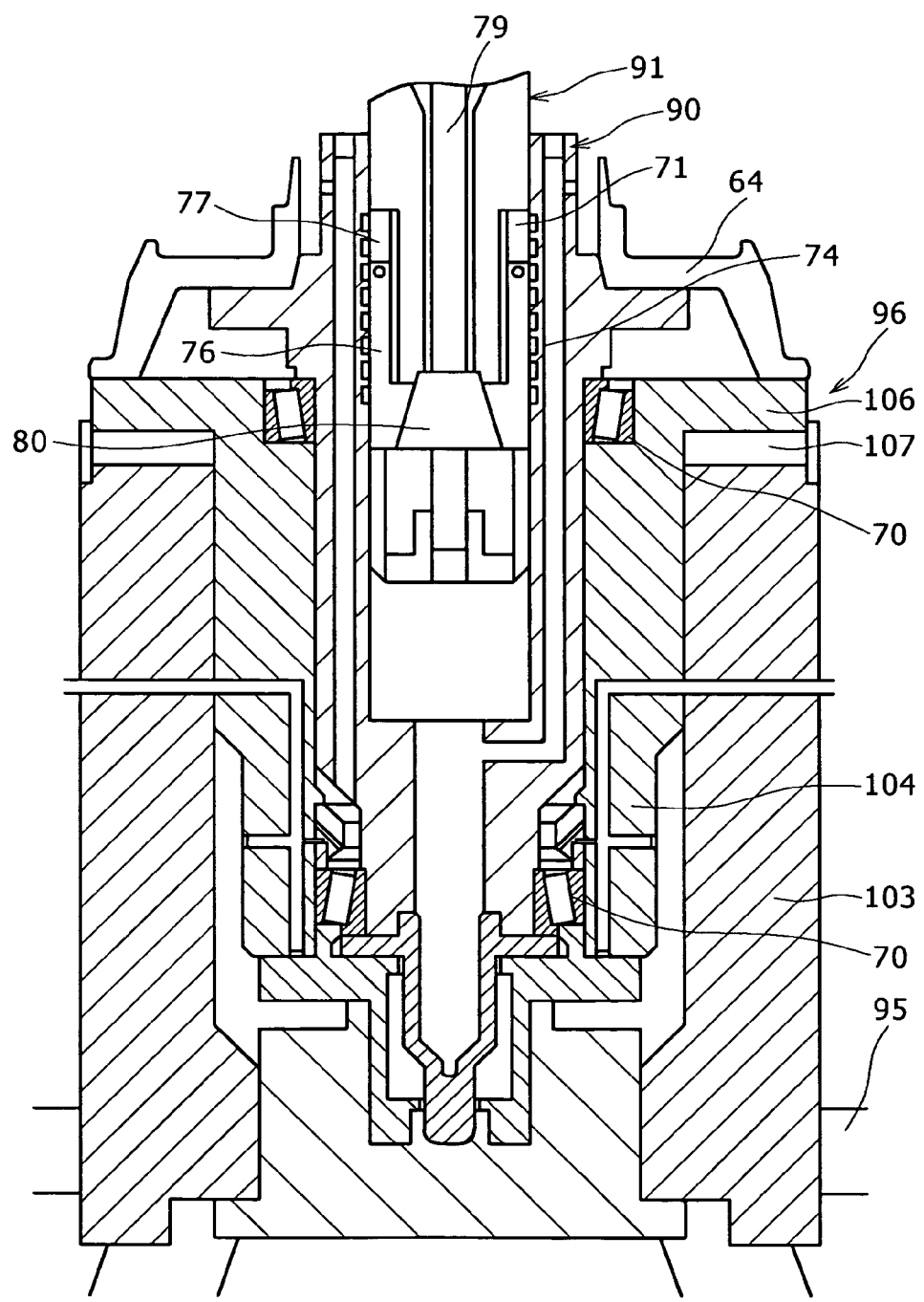
FIG. 13 is a detailed cross sectional view of a spindle device.

As shown in FIG. 13, the housing 96 includes a tubular spindle base 103 which is attached to the mounting table 95 by means of welding or the like, and a bearing housing 104 which is contained in the spindle base 103 from above.

A collar portion 106 which extends radially outward from an outer periphery of the bearing housing 104 is provided on an upper portion of the bearing housing 104. A load detector 107 which measures the uniformities of the tire T is provided between this collar portion 106 and a top end of the spindle base 103. This load detector 107 includes a load cell or the like.

The lower spindle 90 is formed as a cylindrical shape, and is contained in the bearing housing 104. The lower spindle 90 is rotationally supported with respect to the bearing housing 104 by the spindle bearings 70 separated vertically between the bearing housing 104 and the lower spindle 90.

The lock portions 74 are provided on an inner wall of the lower spindle 90 along the entire periphery thereof, and a plurality of the lock portions 74 are provided vertically from a middle portion to a lower portion on the lower spindle 90.

Figure 14:
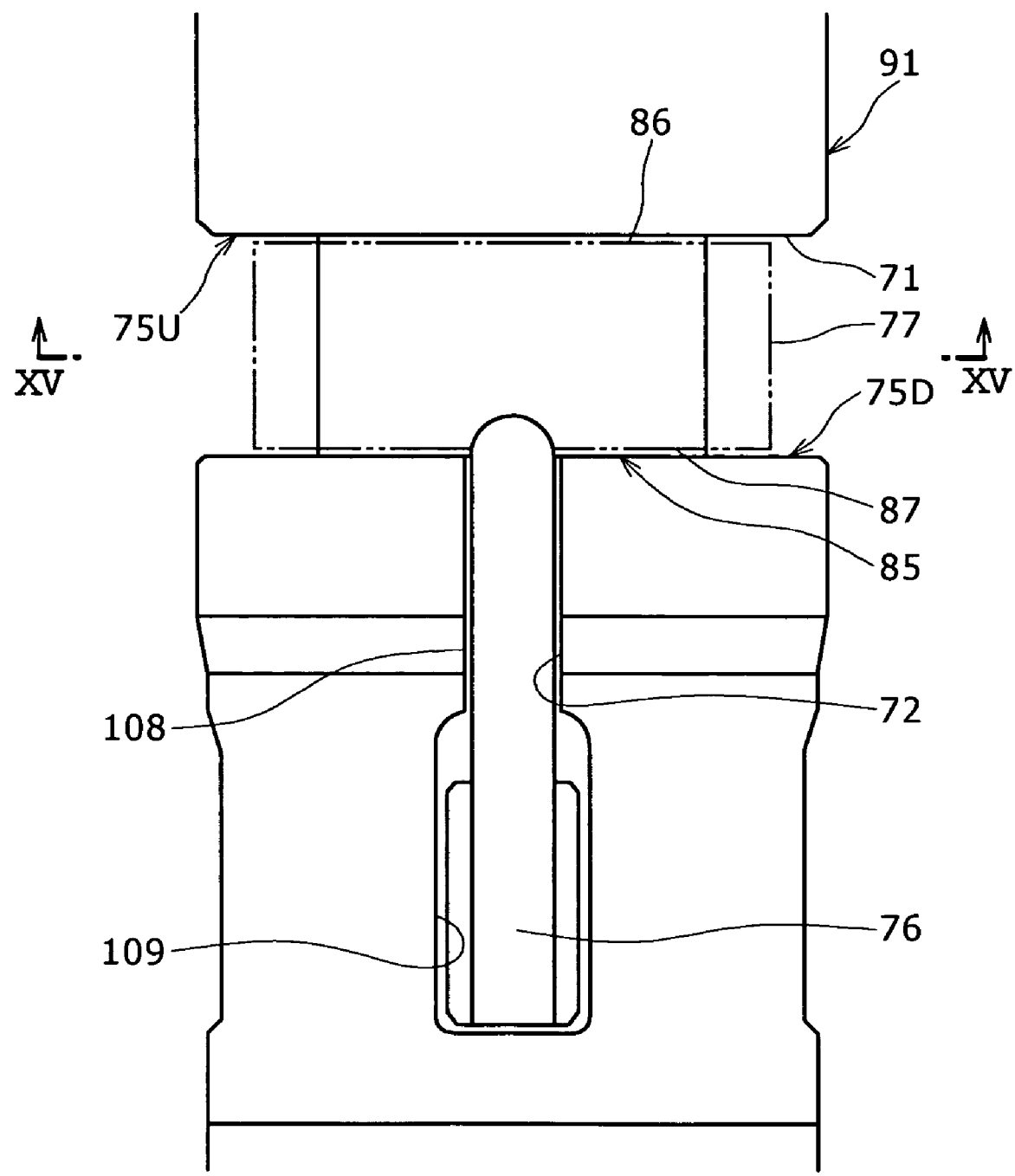
FIG. 14 is a detailed view of the shape of an upper spindle.

As shown in FIGS. 13 to 14, on a lower portion of the upper spindle 91 is provided the cut groove 71 which extends along the entire outer periphery thereof, and is cut radially inward. The upper and lower wall surfaces 75U and 75D of this cut grove 71 are flat surfaces approximately orthogonal to the spindle direction of the upper spindle 91.

Through holes 72, which extend downward in the spindle direction, and extend radially inward from a middle portion so as to pass through the upper spindle 91, are provided on the lower wall 75D of the cut groove 71.

The through holes 72 are provided at an interval of 90 degrees in the peripheral direction, and include an engaging groove portion 108 which extend without forming a thorough hole downward in the spindle direction from the lower wall surface 75D of the cut groove 71, and a through portion 109 which extends radially inward from a lower portion of the engaging groove portion 108, and passes through the upper spindle 91.

Figure 15:
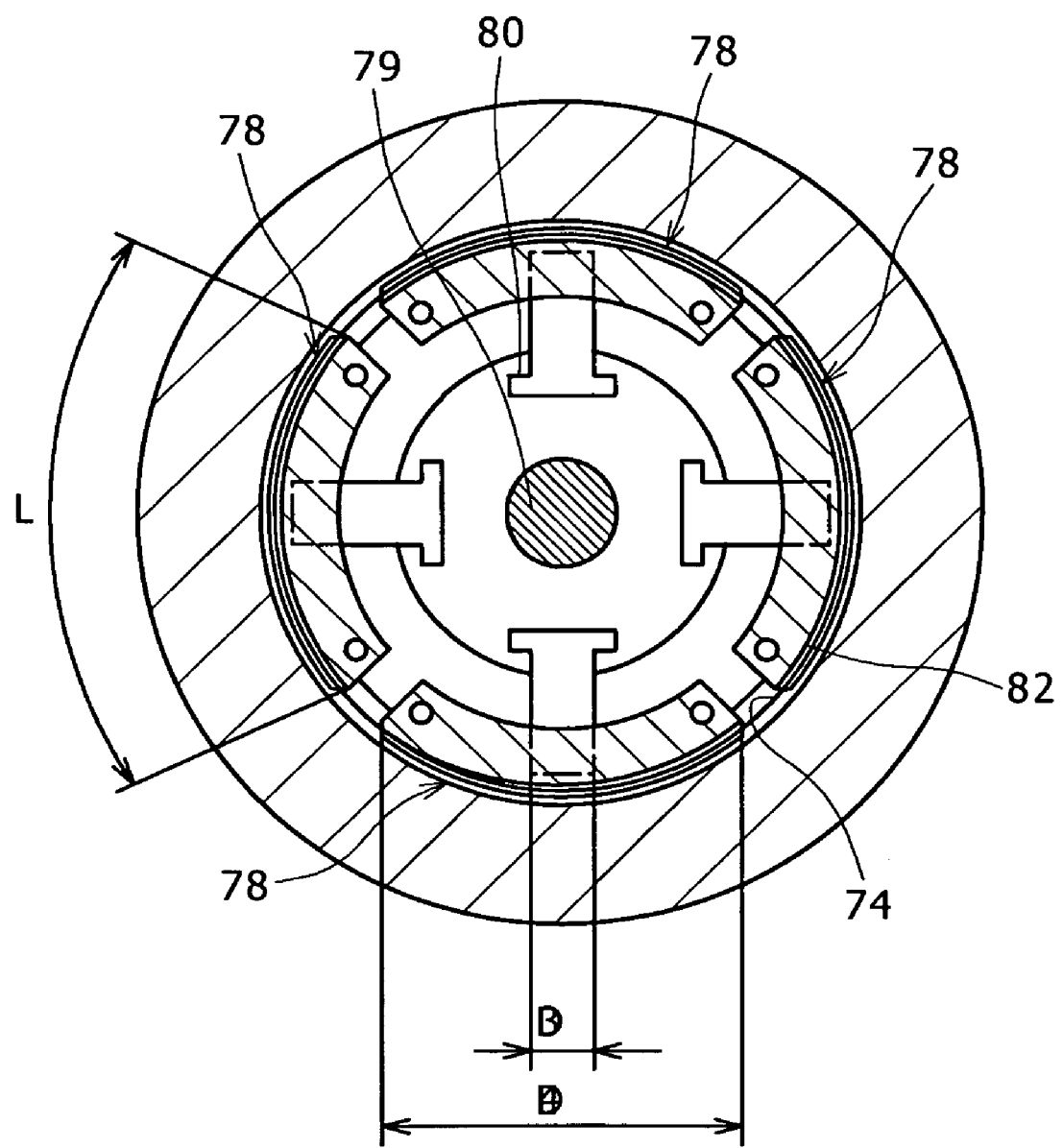
FIG. 15 is a cross sectional view made on a plane and in a direction indicated by XV in FIG. 14.

As shown in FIG. 15, the lock piece 60 includes four lock bodies 78 as the above described embodiment, and includes support portions 76 which are inserted into and engaged with the through holes 72 provided in the upper spindle 91, and extreme end portions 77 which are provided on an extreme end of the support portions 76, engage with the lock portions 74, and include upper and lower surfaces 86 and 87 which can be in contact with the upper and lower walls 75U and 75D of the cut groove 71.

This support portion 76 is formed as a square bar or a plate, and has a cross section approximately in L shape viewed from the side, a middle portion thereof is engaged with the engaging groove portion 108, and a base portion thereof is inserted into the through portion 109.

The support portions 76 can emerge and retract by means of the lock wedge 80 which is supported for a vertical movement via the operation rod 79 in the upper spindle 91.

The extreme end portion 77 is formed in an arc shape extending in the peripheral direction, and is engaged with the cut groove 71. The width D4 in the peripheral direction of the extreme end portion 77 is set larger than the width D3 in the peripheral direction of the support portion 76.

The upper surface 86 and the lower surface 87 of the extreme end portion 77 are formed as flat surfaces approximately orthogonal to the spindle direction of the upper spindle 91, and the plane portions of the lower surface 87 of the extreme end portion 77 and the lower wall surface 75D of the cut groove 71 receive the separating forces. Namely, the contact surfaces of the lower surface 87 and the lower wall surface 75D are formed as the receiving portions 85 to receive the separating forces to provide a surface contact.

According to the present embodiment, as the above embodiment, the outer periphery of the lock piece 60 is formed such that the sum of the length L of the arc of the extreme end portion 77 of the four lock bodies 78 is approximately the same as the length of the outer periphery of the upper spindle 91 forming the cut groove 71.

The present invention is not limited to the above embodiment.

Namely, though the outer periphery of the lock piece 60 is formed to align with the outer periphery of the second spindle when the lock piece 60 is retracted according to the above embodiment, the lock piece 60 may be formed such that when the lock piece 60 is retracted, namely the radius thereof is reduced, the lock piece 60 presents a circular shape so as to stay radially inside the approximately entire outer periphery of the second spindle.

Moreover, the lock piece 60 may be formed such that when the lock piece 60 is protruded, namely the radius there of is increased, the extreme end portions 77 thereof is locked to approximately the entire periphery of the lock portions 74 of the first spindle.

Further, according to the above embodiments, though the lock piece 60 includes the four lock bodies 78, the number of the lock bodies 78 included in the lock piece 60 is not limited to the number of the above embodiment, and may be properly changed.

Namely, the tire testing machine according to the second embodiment includes the tubular first spindle that includes one of the pair of rims, and the lock portions on the inner wall, the columnar second spindle that includes the other one of the pair of rims, and is contained in the first spindle, and the lock piece that is engaged with the second spindle so as to radially protrude from and retract into the second spindle between the position to engage with the lock portions to prevent the first spindle and the second spindle from being separated in the spindle direction, and the position to retract from the lock portions, where the second spindle includes the groove that extends in the peripheral direction along the outer periphery thereof, and is in sliding contact with the lock piece, and the lock piece and the sliding contact surface of the groove are receiving portions that are formed as the flat surfaces to receive the separating forces of the both spindles.

According to the second embodiment, there is provided a tire testing machine on which the lock piece, which receives the separating force of both of the spindles, and the receiving portions of the spindle, which are in sliding contact with the lock piece, hardly present wears for a long period.

Namely, according to the second embodiment, since the lock piece and the sliding contact surface (contact surface) of the groove formed on the second spindle are formed as flat surfaces, and these surfaces server as the receiving portions to receive the separating forces, when the separating forces are received by the receiving portions thereof, the contact areas of these receiving portions substantially increase compared with the conventional arc contact between the lock piece and the through hole (the inner wall surface) of the second spindle. Thus, the increased contact areas of the receiving portions reduce the surface pressure applied on the lock piece and the groove on the second spindle compared with the arc contact, the strengths of the lock piece and the second spindle increase against the separating forces by the reduced amount of the surface pressure, the lock piece is hardly broken or the groove of the second spindle hardly wears even if the separating forces are repeatedly applied to the lock piece and the groove of the second spindle, namely the receiving portions, for a long period.

According to the second embodiment, preferably, the lock portions are formed across the entire periphery of the inner wall of the first spindle, the extreme end portions of the lock pieces are aligned with approximately the entire outer periphery of the second spindle when the lock portions are retracted into the second spindle, and the extreme end portions of the lock piece are locked to approximately the entire outer periphery of the lock portions when the lock portions are protruded from the second spindle.

With this configuration, when the lock piece is retracted, the extreme end portions of the lock piece can be aligned with approximately the entire outer periphery of the second spindle thereby realizing the unlock state, when the lock piece is in the lock state, the extreme end portions of the lock piece can be engaged with approximately the entire periphery of the lock portions provided on the first spindle as much as possible, and it is thus possible to increase the contact areas of the extreme end portions of the lock piece and the lock portions as much as possible.

It is thus possible to reduce the surface pressure applied on the lock piece and the first spindle by increasing the contact areas as much as possible when the separating forces are generated. Since the surface pressure is reduced, the strength of the lock piece and the lock portions of the first spindle increases against the separating forces, and even if large separating forces arise, it is possible to prevent wears from being generated in the lock piece and the lock portions of the first spindle.

Further, according to the second embodiment, the second spindle preferably includes through holes that radially pass, the lock piece preferably includes the bar-shape support portions which are engaged with and inserted into the through holes, and the extreme end portions which are provided on the extreme end of the support portions, and include the receiving portion, and the width in the peripheral direction of the receiving portion of the extreme end portions is set to larger than the width in the peripheral direction of the support portion.

A description will now be given of a tire testing machine 110 according to a third embodiment of the present invention with reference to FIGS. 16 to 20.

Figure 16:
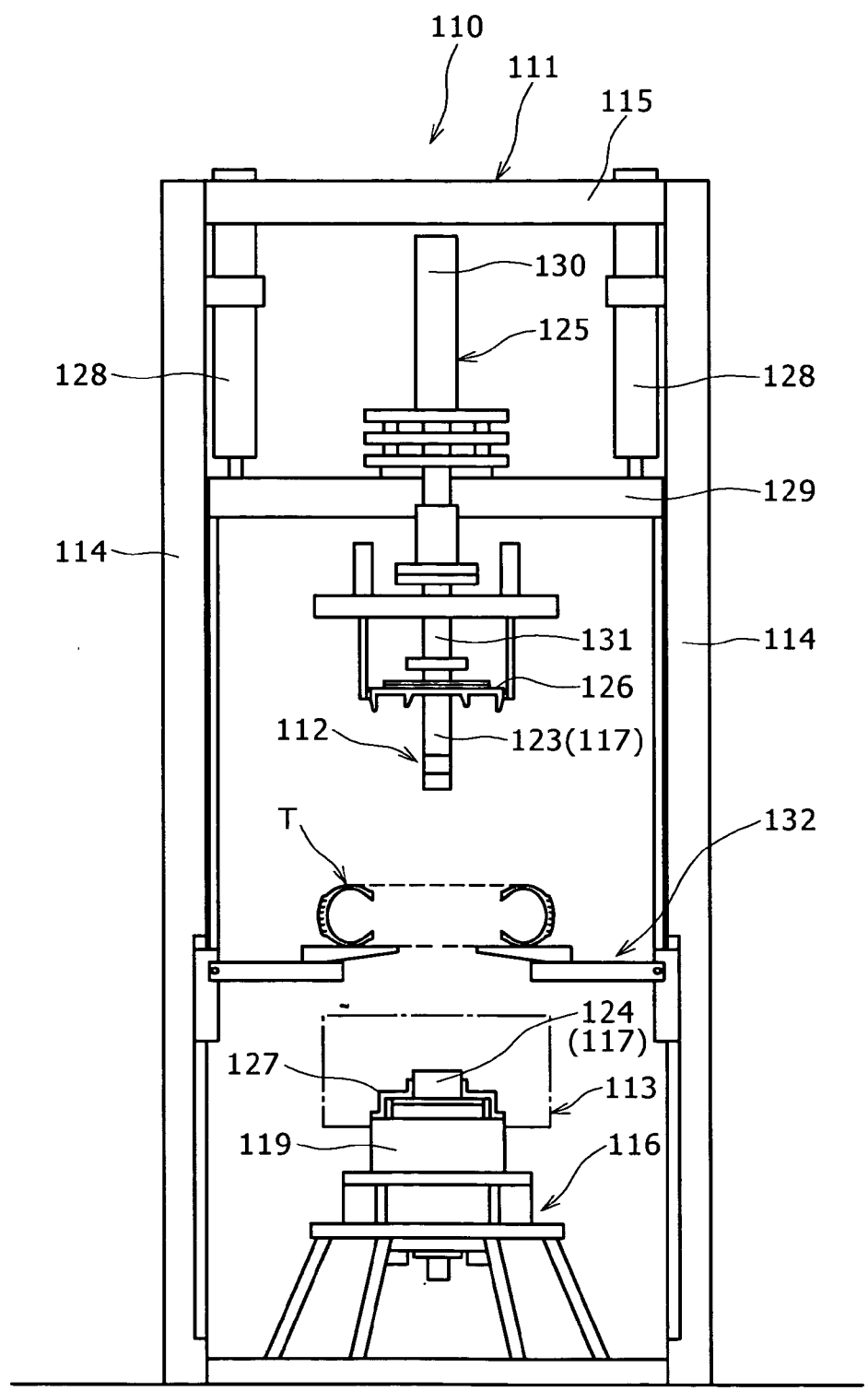
FIG. 16 is an overall front view of a tire testing machine according to a third embodiment of the present invention.
Figure 17:
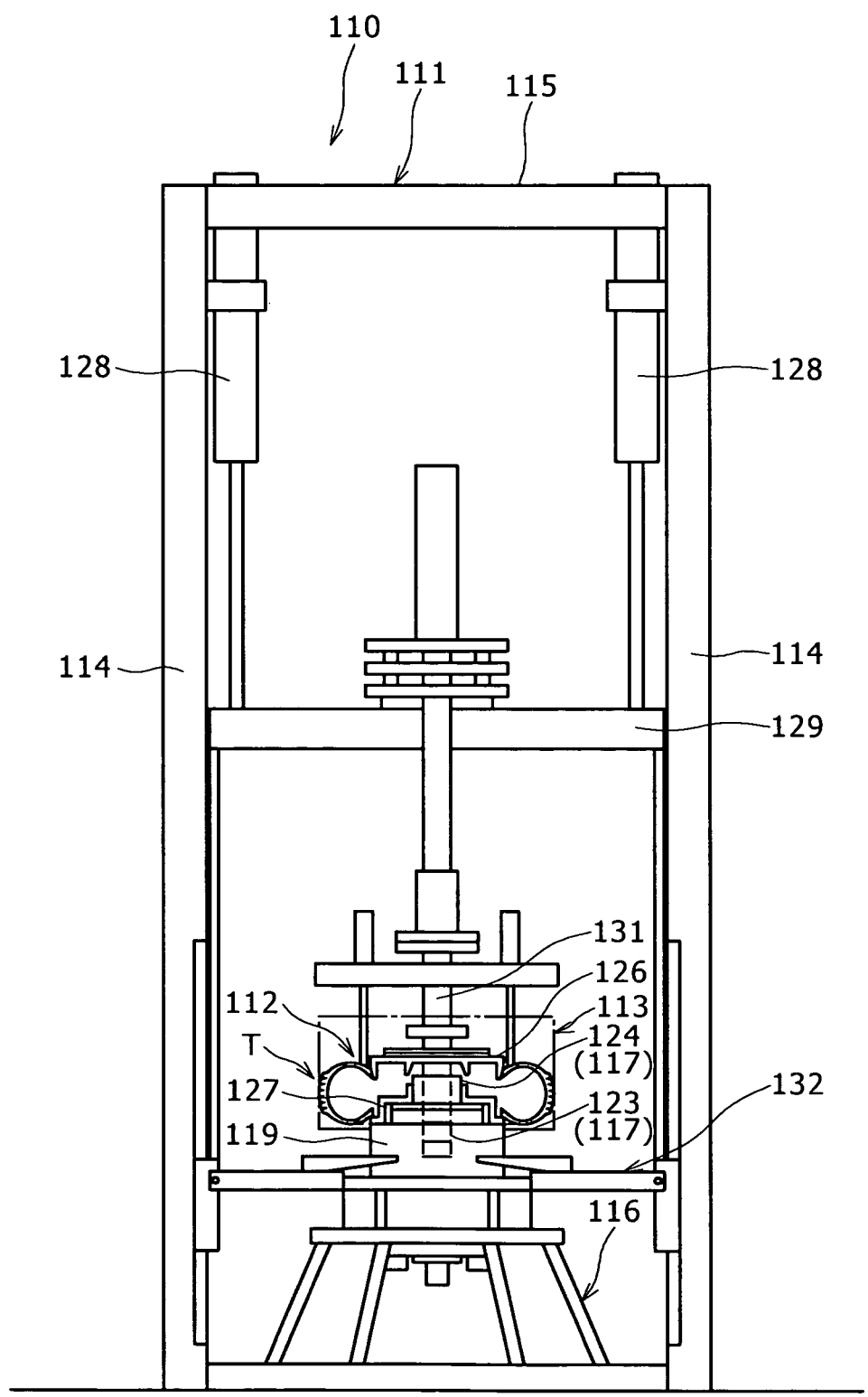
FIG. 17 is an overall front view of the tire testing machine when a tire is mounted.

FIGS. 16 and 17 show an overall front view of the tire testing machine 110.

It should be noted that the left/right direction of the page is the left/right direction, and the direction passing trough the page is the front/rear direction in FIGS. 16 and 17.

The tire testing machine 110 includes a main frame 111 and a spindle device 112 which is supported by the main frame 111, and detachably mount the tire T.

Moreover, the tire testing machine 110 includes a drum device 113 which applies a rotation and a load on the tire T mounted on the spindle device 112.

The main frame 111 includes pillars 114 which are erected from an installation surface on front and rear, and left and right, connection bars 115 which connect top ends and bottom ends of the front and rear, and left and right pillars 114, and a mounting table 116 which mounts the spindle device 112 provided in a frame enclosed by the front and rear, and left and right pillars 114.

Figure 18:
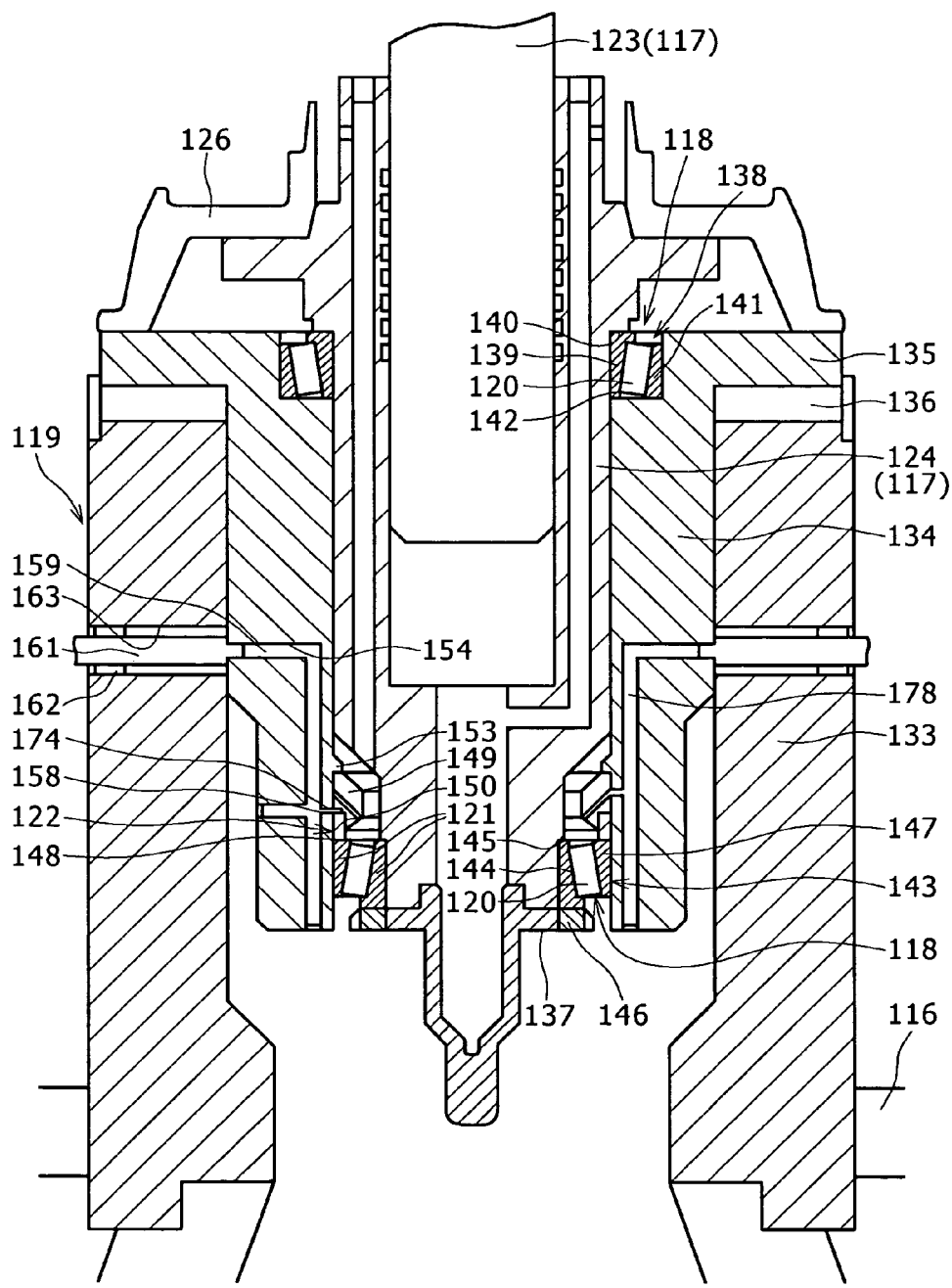
FIG. 18 is a detailed cross sectional view of a spindle device.

As shown in FIGS. 16 and 18, the spindle device 112 includes a spindle 117 which detachably mounts the tire T, and spindle bearings 118 which rotationally support the spindle 117.

Moreover, the spindle device 112 includes a housing 119 which supports the spindle bearings 118 and the spindle 117.

The spindle device 112 includes a correction device 122 which can corrects gaps between an outer ring and rolling elements, and between an inner ring and the rolling elements of the spindle bearing 118 during the rotation of the spindle 117.

The spindle 117 is formed vertically separable, and includes an upper spindle 123 which is provided on the upper side of the main frame 111, and a lower spindle 124 which is provided on the lower side of the main frame 111.

The upper spindle 123 is supported for moving vertically by a lift device 125 supported by the main frame 111. The lower spindle 124 is rotationally supported by the housing 119.

An upper rim 126 is provided on the upper spindle 123, a lower rim 127 is provided on the lower spindle 124, which provides such a configuration to hold the tire T between the upper and lower rims 126 and 127.

The lift device 125 includes a pair of side lift cylinders 128 which are supported by the pillars 114 of the main frame 111, and a center frame 129 which horizontally connects the side lift cylinder 128. Moreover, the lift device 125 includes a center lift cylinder 130 which is supported by the center frame 129, and a lift rod 131 which passes through the center lift cylinder 130 for vertically emerging and retracting.

An upper portion of the upper spindle 123 is connected to a lower portion of the lift rod 131, and the upper spindle 123 is internally engaged with the lower spindle 124 as the lift rod 131 moves vertically.

A tire loading table 132 is connected to the both left and right ends of the center frame 129 which is operationally connected with lift up/down of the center frame 129, the tire loading table 132 moves down and places the tire T on the lower rim 127 provided on the lower spindle 124 when the center frame 129 moves down.

As shown in FIG. 18, the housing 119 includes a tubular spindle base 133 which is attached to the mounting table 116 by means of welding or the like, and a bearing housing 134 which is contained in the spindle base 133 from above.

The lower spindle 124 is internally engaged with the bearing housing 134. On an upper portion of the bearing housing 134 is provided a collar portion 135 which extends radially outward from an outer periphery of the bearing housing 134.

A load detector 136 which measures the uniformities of the tire T is provided between this collar portion 135 and a top end of the spindle base 133. This load detector 136 includes a load cell or the like.

The spindle bearings 118 rotationally support the lower spindle 124, and two of the spindle bearings 118 are vertically provided up and down between the lower spindle 124 and the bearing housing 134.

The spindle bearings 118 are tapered roller bearings which can receive an axial load, and support upper and lower portions of the lower spindle 124. It should be noted that the spindle bearings 118 may be angular contact ball bearings.

The inner ring 139 of the upper spindle bearing 138 is engaged from below with a peripheral surface of a step portion 140 provided on an upper portion of the lower spindle 124 thereby supporting the lower spindle 124, is in contact with an end surface in the axial direction of the step 140, and thus cannot move in the spindle axial direction (upward direction). The outer ring 141 of the upper spindle bearing 138 is engaged from above with a peripheral surface of a step portion 142 provided on an upper portion of the bearing housing 134, is in contact with an end surface in the axial direction of the step 142, and thus cannot move in the spindle axial direction (downward direction).

The inner ring 144 of the lower spindle bearing 143 is engaged from below with a peripheral surface of a step portion 145 provided on a lower portion of the lower spindle 124, and is fixed to a support portion 137 and a fixing member 146 threadedly attached to an outer periphery of the support portion 137 from below so as not to move in the spindle axial direction.

Namely, this fixing member 146 is constructed by a nut threadedly engaged with the outer periphery of the support portion 137. The nut 146 is threadedly engaged with the support portion 137 thereby causing an upper surface of the nut 146 to fix the inner ring 144 of the lower spindle bearing 143 to the lower spindle 124.

It should be noted that though the fixing member 146 is constituted by the nut (bearing nut) as shown in FIG. 18, the inner ring 144 of the lower spindle bearing 143 may be fixed by a flange integrally provided on the support portion 137.

The outer ring 147 of the lower spindle bearing 143 is supported by the bearing housing 134 for moving in the spindle axial direction.

Figure 19:
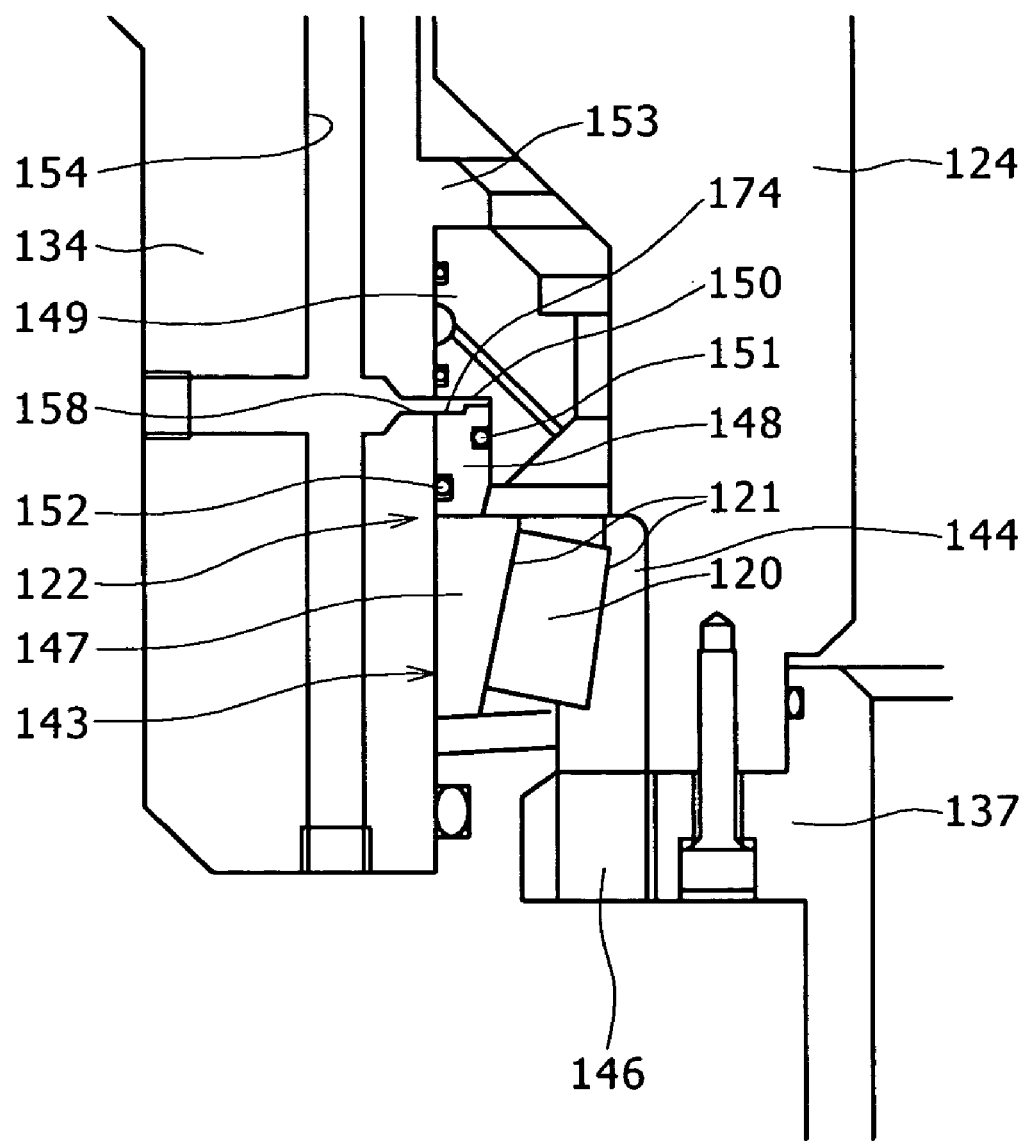
FIG. 19 is a detailed partial view of the spindle device.

As shown in FIGS. 18 and 19, the correction device 122 corrects the gap between the inner ring 144 of the lower spindle bearing 143 and the rolling elements 120 of the lower spindle bearing 143, or the gap between the outer ring 147 and the rolling elements 120 to an optimal gap when the lower spindle 124 is rotated by the tire testing machine.

In more detail, the correction device 122 corrects the gap by moving the outer ring 147 of the lower spindle bearing 143, which is movable in the spindle axial direction, in the spindle axial direction, thereby squeezing the rolling bodies 120 including tapered rollers between tapered surfaces 121 of the inner ring 144 and the outer ring 147 of the lower spindle bearing 143.

An optimal gap on this occasion is a gap set such that the run out of the lower spindle 124 is as small as possible when the lower spindle 124 rotates, and the run out of the lower spindle 124 hardly influences the uniformity measurement of the tire T.

The correction device 122 including a pressing body 148 which moves the spindle direction of the spindle 117 to press the outer ring 147 of the lower spindle bearing 143 thereby correcting the gap between the inner ring 144 and the rolling elements 120 or between the outer ring 147 and the rolling elements 120 of the lower spindle baring 143.

A lubricant ring 149 which supplies the lower spindle bearing 143 with lubricant is internally engaged with the bearing housing 134 so as to surround the lower spindle 124 located on the upper side of the lower spindle bearing 143, and an engaging recessed portion 150 which is liquid-tightly engaged with the pressing body 148 is formed on an outer peripheral surface of a lower portion of the lubricant ring 149.

This pressing body 148 is formed as a piston in a ring shape, and is engaged with the engaging recessed portion 150 in a ring shape of the lubricant ring 149. Wall surfaces of the engaging recessed portion 150 and the pressing body 148 form a space portion 174. The pressing body 148 moves in the spindle direction with respect to the lubricant ring 149.

The pressing body 148 is positioned on the upper side of the outer ring 147 of the lower spindle 143, and presses the outer ring 147 downward from above.

An O ring 151 is interposed between the pressing body 148 and the lubricant ring 149, and an O ring 152 is also interposed between the pressing body 148 and the bearing housing 134.

The lubricant ring 149 is in contact from below with a protruded portion 153, which is protruded radially inward from an inner peripheral surface of the bearing housing 134, is thus immovable in the spindle axial direction, and is configured to supply the lower spindle bearing 141 with the lubricant from above. A lubricant supply passage 178 which supplies the lubricant ring 149 with the lubricant is provided in the spindle device 112.

This lubricant supply passage 178 is connected to an external pressure regulating valve 155a (refer to FIG. 20), and the pressure regulating valve 155a is connected to a pump 157 and an accumulator 156 so that the lubricant can be supplied to the lubricant ring 149.

The correction device 122 includes a pressure supply passage 154 which applies the pressure of a fluid to the pressing body 148 so that the pressing body 148 can be moved by the pressure of the fluid.

Figure 20:
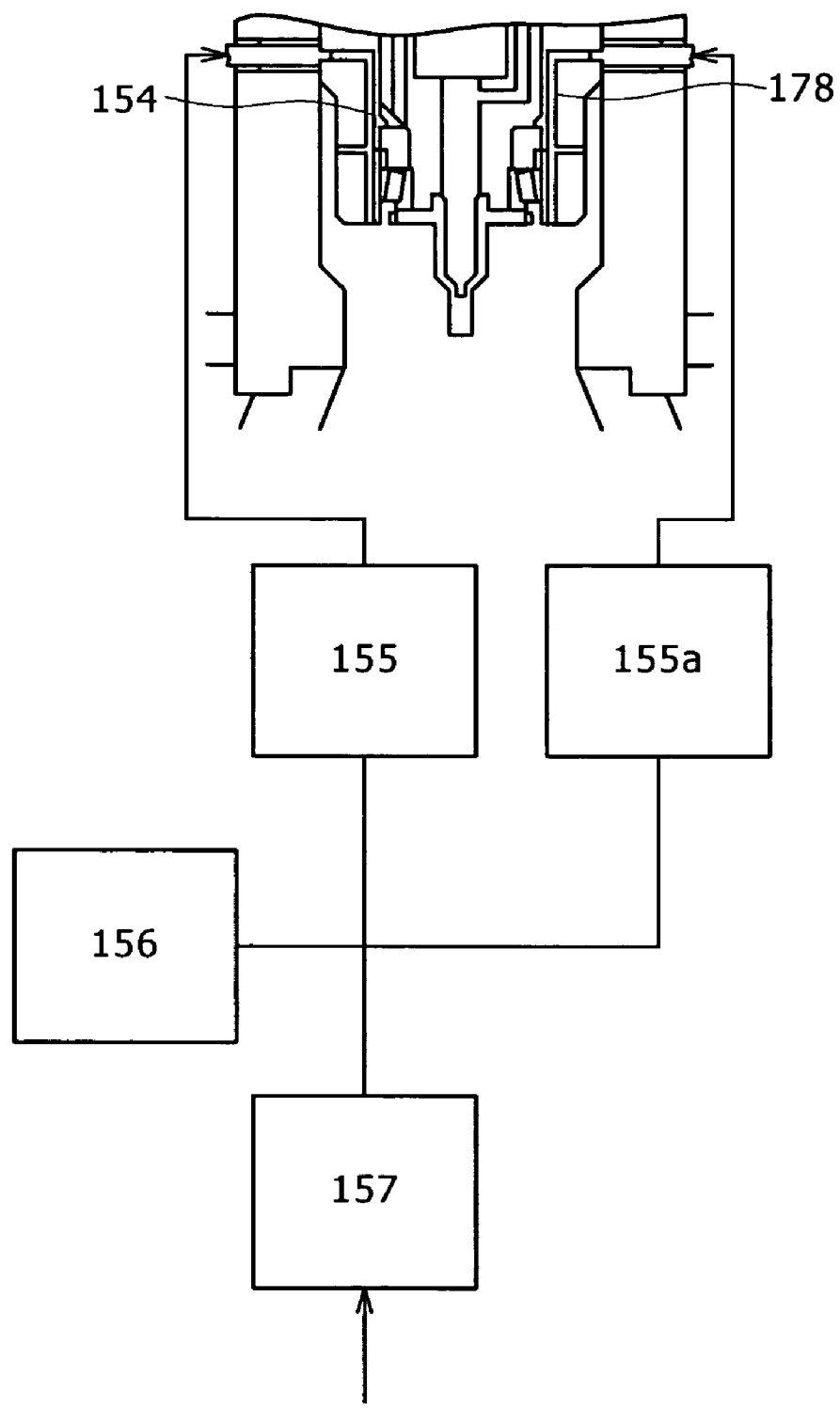
FIG. 20 is a diagram of a circuit to supply the spindle device with a fluid from the outside.
Figure 21:
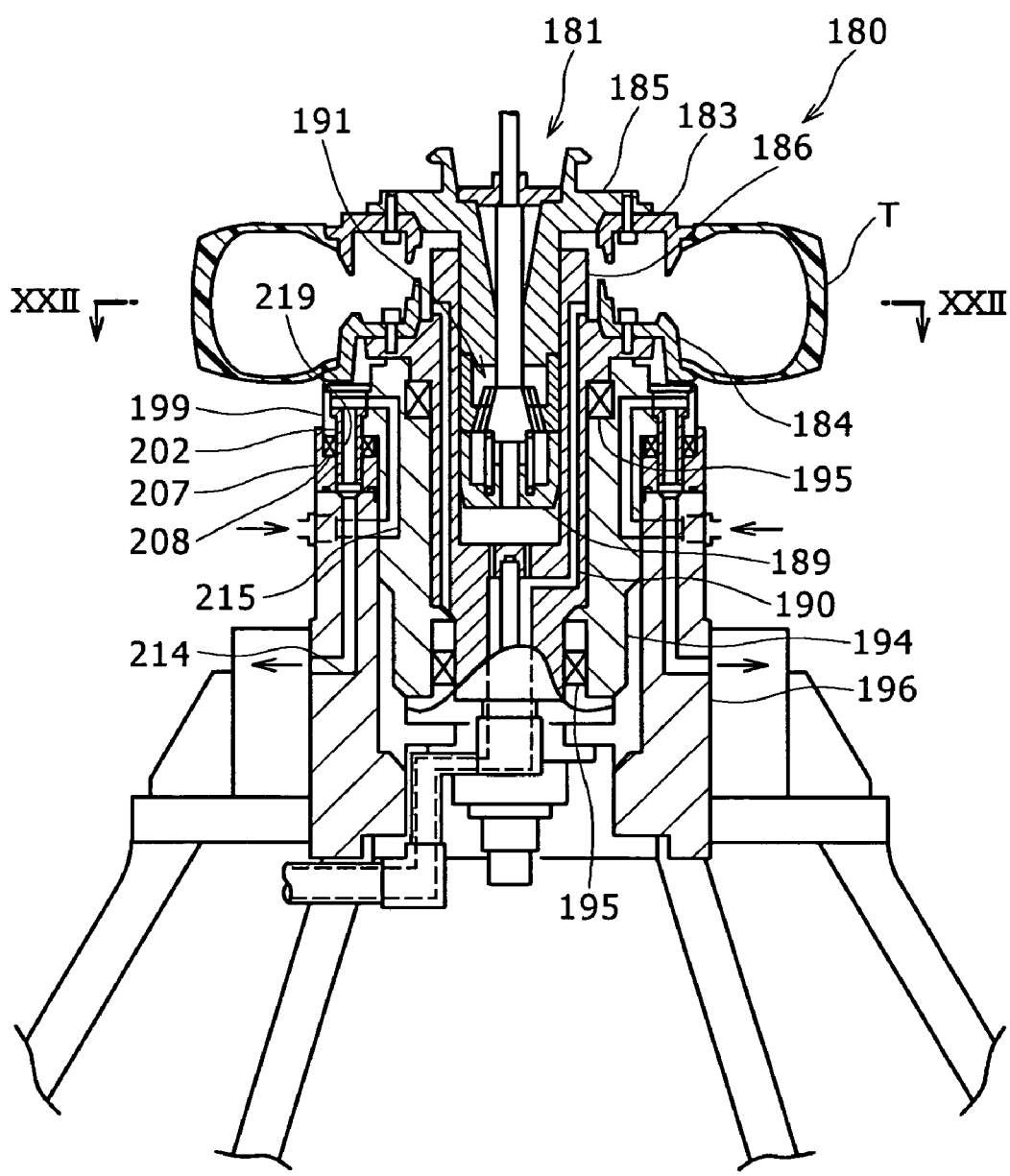
FIG. 21 is a front cross sectional view of a tire testing machine according to a fourth embodiment of the present invention.
Figure 22:
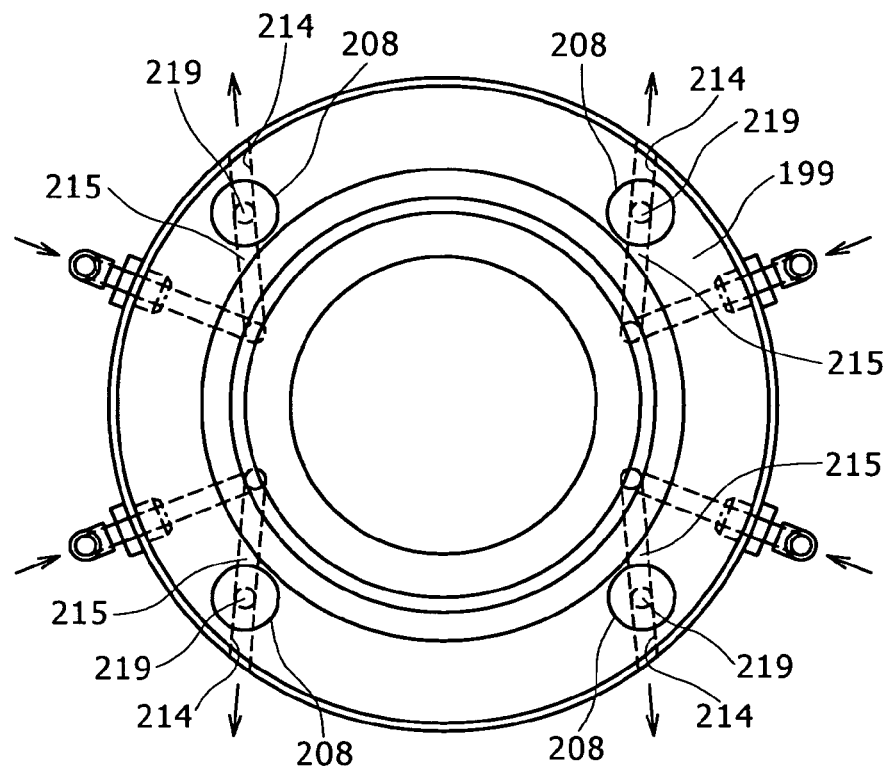
FIG. 22 is a view made on a plane and in a direction indicated by XXII in FIG. 21 (plan view of a bearing housing and a spindle base)
Figure 23:
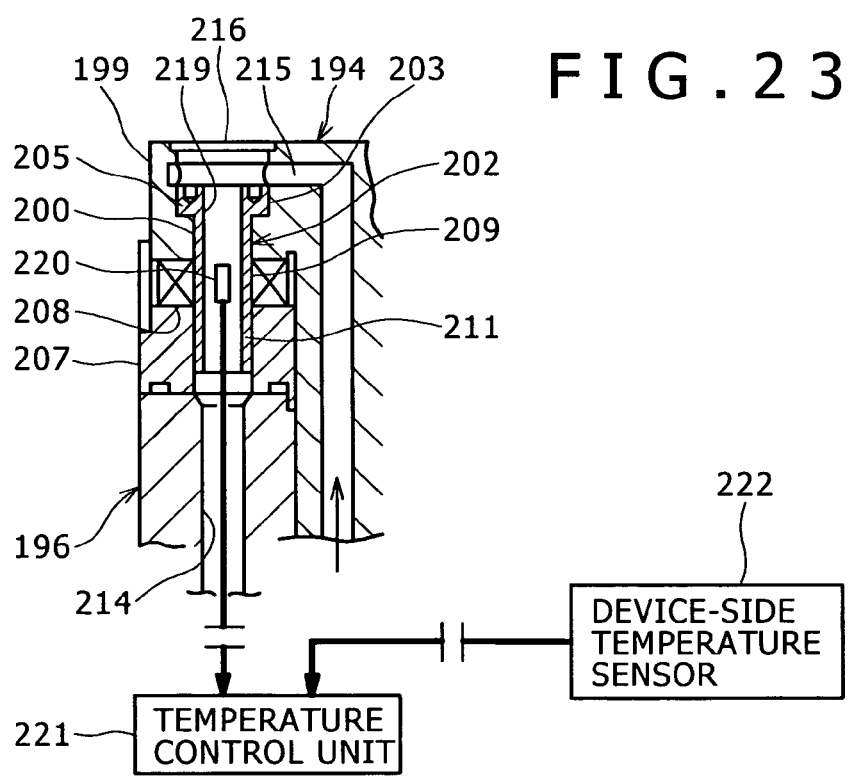
FIG. 23 is an enlarged view of a principle part (vicinity of detectors) of FIG. 21.
Figure 24:
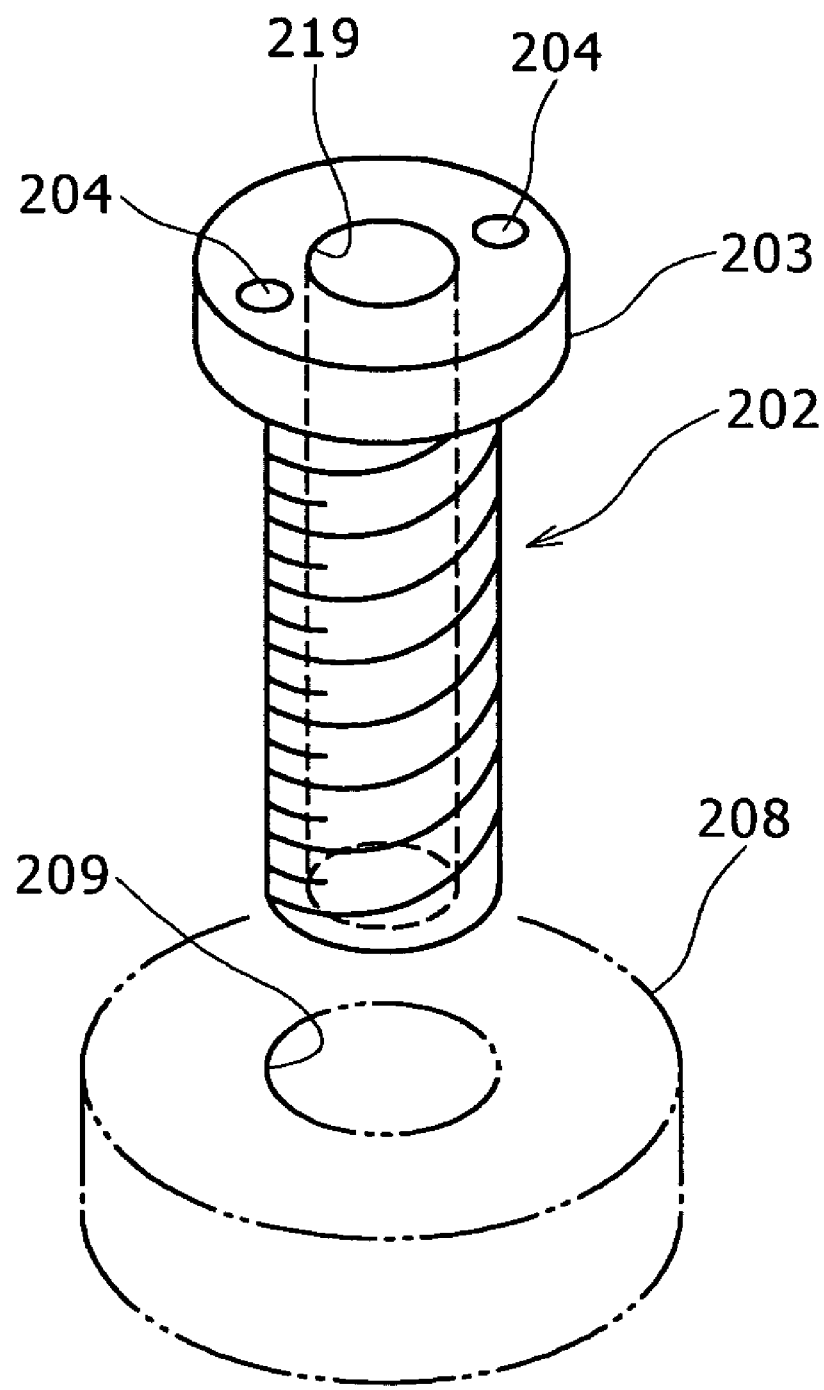
FIG. 24 is a perspective view showing a preload bolt.

As shown in FIGS. 18 to 20, the pressure supply passage 154 is provided in the bearing housing 134, and the fluid can be supplied to the pressure supply passage 154 via the pump 157, the accumulator 156, and the pressure regulating valve 155 provided outside the spindle device 112.

The pressure supply passage 154 is bored radially inward in a middle portion in the vertical direction on the outer peripheral surface of the bearing housing 134, and is further bored in the spindle direction in the bearing housing 134 so as to bend downward in a middle portion. The pressure supply passage 154 includes a branch passage 158 which branches radially inward. The branch passage 158 reaches a top end side of the pressing body 148, and can supply the space portion 174 constituted by the wall surface of the pressing body 148 and the engaging recessed portion 150 of the lubricant ring 149 with the fluid.

At least one of openings formed on upper and lower ends of the pressure supply passage 154 is designated as an inlet opening 159 for filling the fluid, and the other openings are plugged by plugs.

According to the present embodiment, as shown in FIG. 18, a hole 163 is provided in the spindle base 133 at a position corresponding to the pressure supply passage 154. The opening on the hole 163 side is designated as the inlet opening 159, and a pipe 161 is provided in the hole 163, the inlet opening 159 is connected to one end of the pipe 161, and the pressure regulating valve 155 provided outside is connected to the other end thereof.

The diameter of the hole 163 is larger than that of the pipe 161, and a space (non-contact portion) is provided between the hole 163 and the pipe 161.

The non-contact portion prevents the pipe 161 and the spindle base 133 from coming in direct contact with each other thereby releasing the loads to be measured to the spindle base 133 when the measured loads of the tire T (forces generated from the tire T) are detected by the load cell 136 between the collar portion 135 of the bearing housing 134 and the spindle base 133 via the lower spindle 124 and then the lower spindle bearing 143.

Namely, the non-contact portion prevents the measured loads of the tire T from distributed to other devices such as the pressure regulating valve 155 and the accumulator 156, and the pipe 161 and the spindle base 133 are not in direct contact with each other, and are in a non-contact state.

An elastic ring 162 (V ring) is externally engaged with the pipe 161, and the ring 162 prevents dusts from entering.

The pressure supply passage 154 may route in various ways in the housing 119, and passes close to the lower spindle bearing 143 according to the present embodiment.

The fluid which moves the pressing body 148 is a liquid or a gas, also serves as a cooling fluid which cools the spindle device 112, and is hydraulic oil which moves the pressing body 148 according to the present embodiment. The hydraulic pressure of the hydraulic oil can move the pressing body 148 in the spindle direction.

As shown in FIG. 20, the hydraulic oil which moves the pressing body 148 and the lubricant are supplied from the common pump 157, and the hydraulic oil and the lubricant are used in common.

With this configuration, before the test of the tire T, a preload applied to the outer ring of the lower spindle bearing 143 is set in consideration of the gap between the inner ring 144 and the rolling elements 120 and the optimal gap between the outer ring 147 and the rolling elements 120 during the test based on the rotation speed of the tire T and the load applied to the lower spindle 143.

The pump 157 then feeds the hydraulic oil to the pressure supply passage 154 to correct the gaps between the inner ring 144 and the rolling elements 120 and between the outer ring 147 and the rolling elements 120 of the lower spindle bearing 143 in the stationary state so that the gaps between the inner ring 144 and the rolling elements 120 and between the outer ring 147 and the rolling elements 120 are optimal after the start of the test by causing the pressure of the hydraulic oil to move the pressing body 148 closer to the inner ring 144 to push the outer ring 147 toward the spindle axial direction (reducing the distance between the inner ring 144 and the outer ring 147). The pressure inside the pressure supply passage 154 is regulated by the pressure regulating valve 155.

When the test of the tire T starts, the tire T is rotated, the gaps are optimal immediately after the start, the gaps between the inner ring 144 and the rolling elements 120 and between the outer ring 147 and the rolling elements 120 of the lower spindle bearing 143 deviate from a range of the optimal gaps and tend to increase due to the heat generation of the lower spindle bearing 143 as the time elapses, the pressing body 148 is pressed and moved by the pressure of the hydraulic oil whose pressure is regulated to a predetermined value to press the outer ring of the lower spindle bearing 143, and the gaps do not increase and are kept optimal.

On this occasion, since the generated heat of the lower spindle bearing 143 increases as the time elapses, and the gaps between the inner ring 144 and the rolling elements 120 and between the outer ring 147 and the rolling elements 120 of the lower spindle bearing 143 deviate from the range of the optimal gaps and tend to increase, the pressing force of the pressing body 148 applied on the outer ring of the lower spindle bearing 143 may be increased in advance in order to maintain the these gaps optimal.

However, if the pressing force applied to the outer ring 147 of the lower spindle bearing 143 by the pressing body 148 is increased before the test, namely from the beginning, though the rigidity of the lower spindle bearing 143 can be increased, and the run out of the lower spindle 124 as small as possible, the load is large due to the large pressing force from the beginning, which results in a shorter life of the lower spindle bearing 143.

Thus, as the time elapses, in other words, according to a change of the gaps between the inner ring 144 and the rolling elements 120 and between the outer ring 147 and the rolling elements 120 of the lower spindle bearing 143, which tend to deviate from the range of the optimal gaps and to increase, the pressure of the fluid inside the pressure supply passage 154 is preferably increased to press the outer ring 147.

If the outer ring 147 of the lower spindle bearing 143 is moved in the spindle axial direction as described above, the pressing force is also applied to the inner ring 140 of the upper spindle bearing 138, the rolling elements 120 along with the inner ring 140 move the spindle axial direction, namely downward, and a preload is thus applied to the upper spindle bearing 138.

Moreover, the gaps between the inner ring 144 and the rolling elements 120 and between the outer ring 147 and the rolling elements 120 may be corrected by providing a temperature sensor such as a thermocouple close to the lower spindle bearing 143, and changing the pressure of the pressure supply passage 154 based on temperature information acquired from the temperature sensor.

Since the hydraulic oil operating the pressing body 148 is also used as a cooling fluid which cools the bearing housing 134, the bearing housing 134 itself and the lower spindle bearing 143 via the bearing housing 134 can be cooled, thereby restraining the heat generation on the lower spindle bearing 143 and the bearing housing 134, and restraining the variation in the gaps between the inner ring 144 and the rolling elements 120 and between the outer ring 147 and the rolling elements 120 of the lower spindle bearing 143, and the variation in the gap of the main unit between the bearing housing 134 and the lower spindle bearing 143.

The present invention is not limited to the above embodiment.

Namely, though the pressing body 148 may press the outer ring 147 of the lower spindle bearing 143 thereby correcting the gaps between the inner ring 144 and the rolling elements 120 and between the outer ring 147 and the rolling elements 120 of the lower spindle bearing 143 according to the above embodiment, the position of the pressing body 148 may be changed to press the inner ring 144.

Moreover, though the pressure supply passage 154 is provided in the bearing housing 134 to apply the pressure of the fluid to the pressing body 148 thereby moving the pressing body 148 by means of the pressure of the fluid, the pressure supply passage 154 may be routed entirely across the housing 119 and the bearing housing 134 on this occasion, and a cooling fluid may be used as the fluid thereby cooling the entire housing 119 or the entire bearing housing 134.

Preferably, the pressure supply passage 154 is routed to cool the bearing housing 134 around portions where the upper spindle bearing 138 and the lower spindle bearing 143 are provided by means of the cooling fluid.

Though the correction device 122 applies the preload to the lower spindle bearing 143 by moving the pressing body 148 including the piston in the ring shape by means of the fluid, multiple pistons provided in the peripheral direction may be instead employed for the lower spindle bearing 143. Moreover, a spring may be provided between the lower spindle bearing 143 and the bearing housing 134, and the gaps between the inner ring 144 and the rolling elements 120 and between the outer ring 147 and the rolling elements 120 of the lower spindle bearing 143 may be corrected by a force of the spring.

Moreover, as shown in FIG. 20, the same supply circuit supplies the pressure supply passage 154 and the lubricant supply passage 178 with the fluid, independent supply circuits may be provided.

Namely, the tire testing machine according to the third embodiment includes the spindle that is used to detachably mount the tire, and the spindle bearings that rotationally support the spindle, comprising the correction device that corrects the gap between the inner ring of the spindle bearing and the rolling elements of the spindle bearing, or the gap between the outer ring of the spindle bearing and the rolling elements of the spindle bearing while the spindle is being rotated.

According to the third embodiment, the accuracy of the measurement of the uniformities of the tire can be increased by correcting the gaps between the inner ring and the rolling elements and between the outer ring and the rolling elements of the spindle bearing.

Namely, according to the third embodiment, since there is provided the correction device which corrects the gap between the inner ring and the rolling elements and the gap between the outer ring and the rolling elements of the spindle bearing, even if the amount of the generated heat in the spindle bearing changes, and the gap between the inner ring and the rolling elements and the gap between the outer ring and the rolling elements of the spindle bearing during the tire test deviate from proper gaps, the correction device can correct the gap between the inner ring and the rolling elements and the gap between the outer ring and the rolling elements of the spindle bearing to the optimal gaps during the tire test, thereby reducing the run out of the rotating spindle, and thus increasing accuracy of the uniformity measurement of a tire.

According to the third embodiment, the correction device preferably includes the pressing body that is provided to move in the spindle axial direction, and moves to press the outer ring, thereby correcting the gaps, and the pressure supply passage that applies the pressure of the fluid to the pressing body to move the pressing body by means of the pressure of the fluid.

According to this configuration, the pressure of the fluid is applied to the pressing body to move the pressing body, thereby adjusting the distance in the spindle direction between the inner ring and the outer ring of the spindle bearing, resulting in correcting the gaps between the inner ring and the rolling elements and between the outer ring and the rolling elements of the spindle bearing. Thus, a slight change in the distance between the inner ring and the outer ring of the spindle bearing can be addressed by changing the pressure of the fluid in the pressure supply passage, resulting in an easy control of the gaps.

Moreover, according to the third embodiment, the fluid is preferably used also as the cooling fluid which cools the spindle device.

With this configuration, the heat generation of the spindle bearings can be restrained during the tire test by cooling the spindle device by means of the cooling fluid, thereby reducing the variations of the gaps due to the thermal expansion of the spindle bearings and the bearing housing during the test as much as possible.

A description will now be given of a tire testing machine 180 according to a fourth embodiment of the present invention with reference to FIGS. 21 to 24.

FIGS. 21 to 24 show the embodiment of the tire testing machine 180 according to the present invention. The tire testing machine 180 includes a spindle device 181 which rotationally holds the tire T inflated at a predetermined internal pressure. For the tire T held by the spindle device 181, a drum rotationally driven by a drum device (not shown) is brought in contact with an outer peripheral surface (tread surface) thereof, thereby transmitting a rotational force.

The spindle device 181 exemplified in the drawing includes a pair of upper and lower rims 183 and 184, and both of the rims 183 and 184 are brought in contact with bead portions on the both sides of the tire T, the tire T is filled with a pressurized gas (air) in this state, and the inflated tire T under test is held between both the rims 183 and 184. The respective rims 183 and 184 are supported by respective upper and lower spindles 185 and 186 at rotational center portions thereof, multiple types of the respective rims 183 and 184 are provided according to the tire size of the tire T, and they are replaced to ones of proper size for each measurement.

The upper spindle 185 can be lifted up and down by a lift cylinder (not shown), the lower spindle 186 stands by at a lower position, the tire T is loaded to and unloaded from the lower rim 184 when the upper spindle 185 moves up, and the upper rim 183 is separated from the lower rim 184, and the tire T loaded on the lower rim 184 is held between the upper and lower rims 183 and 184 when the upper spindle 185 moves down, and the upper rim 183 is close to the lower rim 184.

A male side engaging portion 189 which protrudes downward is provided on the upper spindle 185, a female side engaging portion 190 which is to be externally engaged with the male side engaging portion 189 is provided on the lower spindle 186, the upper and lower spindles 185 and 186 thus smoothly slide up/down without a backlash due to a mutual male/female engagement. Moreover, lock means 191 which prevents a relative vertical movement according to necessity is provided on the male side and female side engaging portions, and a relative separation of the upper and lower rims 183 and 184 are restricted during inflation of the tire T with a pressurized gas, and a subsequent measurement.

The lower spindle 186 is engaged with a bearing housing 194 formed as a tubular shape, and is rotationally supported by bearings 195 contained in the bearing housing 194. The bearing housing 194 is held by an externally-engaging spindle base 196 which includes a tubular portion with an even larger diameter.

A flange 199 which extends radially outward is provided on an upper peripheral portion of the bearing housing 194, and the flange 199 covers an upper surface of the spindle base 196. Bolt through holes 200 are provided at multiple positions (four positions in the illustrated example) in the peripheral direction on this flange 199, and preload bolts 202 can pass through these bolt through holes 200. As FIG. 24 clearly shows, a head portion 203 of the preload bolts 202 is formed as a disk shape, and a tool engaging recessed portion 204 which is engaged with a turning tool is formed on an upper surface thereof. A counter bore 205 (refer to FIG. 23) is thus formed in the bolt through holes 200 provided on the flange 199 of the bearing housing 194 to embed the head portion 203 of the preload bolt 202 to a predetermined depth.

Detectors 208 are provided via a sensor base 207 on an upper surface of the spindle base 196. The detector 208 is formed as a donut shape, and a mounting hole 209 for passing through the preload bolt 202 is provided at the center thereof. Female thread holes 211 which receive the preload bolts 202 are provided in the sensor base 207. The detector 208 is a crystal piezo element, for example, and can detect loads generated in the three directions (three component forces): radial direction, axial direction, and tangential direction.

The bearing housing 194 and the spindle base 196 are fixed to each other, and a predetermined preload (compressing force in the lengthwise direction) is applied to the detectors 208 therebetween by providing the sensor base 207 and the detectors 208 on the upper surface of the spindle base 196, placing the flange 199 of the bearing housing 194 thereupon, inserting the preload bolts 202 through the mounting holes 209 of the detectors 208 from the bolt through holes 200 of the flange 199, and screwing the preload bolts 202 in a threadedly engaging direction into the female thread holes 211 of the sensor base 207.

The preload bolts 202 have a hollow axial center portion. Downstream passages 214 which extend downward around positions corresponding to the female thread holes 211 of the bearing housing 194 are provided in the spindle base 196 accordingly, and the down stream passages 214 are then formed to change the direction thereof radially outward at a position close to a lower portion of the spindle base 196, and pass through to an external surface.

Moreover, upstream passages 215 which communicate with the counter bore 205 of the bolt through holes 200 at the side thereof are provided in the bearing housing 194, the upstream passages 215 extend downward in a peripheral wall of the bearing housing 194, change the direction thereof radially outward with respect to the spindle base 196 at a position different from the position where the upstream passages 214 pass through to the external surface, pass through the peripheral wall of the spindle base 196 to the external surface. The counter bores 205 of the bolt through holes 200 are closed by covers 216 at an upper portion thereof. The covers 216 are formed thin enough not to interfere the communication between the inside the counter bores 205 and the upstream passages 215.

As a result, when a coolant such as water or coolant oil is supplied to the upstream passages 215, the coolant flows along the upstream passage 215, and flows into the hollow portion of the preload bolts 202 via the counter bore 205 of the bolt through holes 200, and then flows through to the external surface of the spindle base 196 of the downstream passages 214. Thus, coolant passages 219 are formed in the hollow portion of the preload bolts 202.

It should be noted that the coolant may be a liquid or a gas, and if the coolant is a gas, the portions where the downstream passages 214 pass through to the external surface are designated as atmosphere releasing portions. Moreover, if the coolant is a liquid, the portions where the downstream passages 214 pass through to the external surface are properly caused to communicate with coolant recovery passages, and the coolant recovery passages are caused to communicate with the upstream passages 215, thereby forming circulating passages.

A temperature sensor 220 is provided in the coolant passage 219 of the preload bolts 202, and the temperature sensors 220 are electrically connected to a temperature control unit 221. The temperature of the coolant passing through the coolant passage 219 of the preload bolts 202 is monitored by the temperature control unit 221, and is processed according to necessity.

A device-side temperature sensor 222 provided for the spindle device 181 is preferably electrically connected to the temperature control unit 221. Namely, the device-side temperature sensor 222 is caused to detect the temperature in a neighborhood of the detectors 208. With this configuration, there can be obtained a difference between temperature data acquired by the temperature sensors 220 in the preload bolts 202, and temperature data acquired by the device-side temperature sensor 222, and temperature control can thus be provided based on the difference value. The object of the temperature control is not only the coolant supplied to the coolant passages 219 of the preload bolts 202, but also coolant supplied to a coolant passage on the device side if a device side coolant passage is provided.

As the above description apparently shows, in the tire testing machine 180 according to the present invention, the preload bolts 202 used to attach the detectors 208 to the spindle device 181 are formed hollow, and the hollow portions are used as the coolant passages 219. The supply pressure and the flow amount of the coolant supplied to the coolant passages 219 are properly adjusted by the pump, and the temperature control is provided by the temperature control unit 221. Though the temperature control by the temperature control unit 221 may be control to maintain a predetermined temperature, feedback control is preferably provided for the coolant itself based on the coolant temperature detected by the temperature sensors 220 provided in the coolant passages 219.

For example, there is acquired a difference between an average value of the output signals of the detectors 208 and an initial reference value, the temperature control unit 221 outputs a command signal to resolve a temperature drift based on presence and generated amount of the temperature drift, a temperature control valve used to control the temperature of the coolant is thus controlled. If the coolant whose temperature is controlled in this way is supplied to the coolant passages 219 of the preload bolts 202, the preload bolts 202 have a smaller mass compared with the bearing housing 194 and the like, and thus have a smaller thermal capacity, the temperature control thereof is relatively easy, and the direct and quick temperature control is provided for the detectors 208 via the preload bolts 202, resulting in an increase of the measurement accuracy. Displacement detecting means may be attached to a wall surface of the preload bolts 202 to monitor an extension of the preload bolts 202, and the temperature control valve may be controlled based on the extensions.

Moreover, on the spindle device 181, a coolant passage is provided also on the device such as in the spindle base 196 so as to cause the coolant passage to pass close to the positions at which the detectors 208 are attached. In this case, cooled dry air, for example, as the coolant is fed to the coolant passage on the device side. Consequently, the detectors 208 are cooled also by the neighborhood via the bearing housing 194 from the spindle base 196.

The coolant supplied to the coolant passage on the device side not only provides an effect to cool the detectors 208 to a certain degree, but also provides an effect to cool the coolant supplied to the inside of the upstream passages 215 and the downstream passages 214 which communicate with the coolant passages 219 of the preload bolts 211. Therefore, the increase of the temperature of the detectors 208 is prevented as much as possible.

As described above, since the spindle base 196 and the bearing housing 194 are cooled by the coolant supplied to the coolant passage on the device side, the difference between the temperature data acquired by the temperature sensors 220 in the preload bolts 202 and the temperature data acquired by the device-side temperature sensor 222 (provided close to the detectors 208) tends to decrease. A difference between a thermal strain of the detector 208 itself and a thermal strain of the preload bolt 202 itself can be small by a configuration that the temperature control unit 221 takes into account the difference as an element of the temperature control, and controls a heat exchanger (hater or cooler) provided in the pump which supplies the coolant, and the drift correction by means of the coolant can be accurate and prompt accordingly.

In order to calibrate temperature characteristics of a charge amplifier of the detector 208, a trial weight or a calibration load cell is used for the calibration before the tire T is mounted, and an initial setting is carried out to set the voltage to "0" using a linear characteristic of the load on this occasion.

The present invention is not limited to the above embodiment, and can be properly changed according to a mode of application.

For example, the detector 208 is not limited to the crystal piezo element. Moreover, detailed configurations such as the number and the positions to install the detectors 208 are not limited.

According to the above embodiment, though the route to supply the coolant passages 219 of the preload bolts 211 with the coolant is directed from the upstream passages 215 to the downstream passages 214, the flow may be inversed. Especially, a gas (such as air) is used as the coolant, it is preferable to generate an upward flow from the downstream passages 214 to the coolant passages 219. If a gas is used as the coolant, the downstream passages 214 are not formed, and the covers 216 which close the counter bores 205 of the bolt through holes 200 of the bearing housing 194 are removed, and open ends are formed there.

The rims 183 and 184 may be arranged to oppose to each other in the horizontal direction. Further, detailed configurations of the tire testing machine can be properly changed.

Namely, the tire testing machine according to the fourth embodiment includes the spindle device which rotationally holds a tire in the state inflated at a predetermined internal pressure, and the drum device that transmits a rotational force to the tire by bringing the drum in contact with the outer peripheral surface of the tire held by the spindle device, comprising the detectors that are provided on the spindle device, and can measure the loads generated by the tire, where the detectors are fixed to the spindle device by inserting the preload bolts through the mounting holes provided through the center portion of the detectors, and the coolant passages formed by hollowing at least at the portion that passes the mounting holes of the detectors are provided in the preload bolts, and the coolant can be supplied to the coolant passages.

According to the fourth embodiment, when the various uniformities of a tire are measured, it is possible to reduce the influence of the temperature due to an increase of the temperature of the bearing housing and the like caused by the operation (rotation of the tire), thereby acquiring measured results with high accuracy.

Namely, according to the fourth embodiment, since the preload bolts used to attach the detectors to the spindle device are hollowed, and the hollowed portions are used as the coolant passages (namely the coolant is supplied to the hollowed portions), it is possible to directly cool the preload bolts themselves. The preload bolts themselves are small in mass compared with the bearing housing and the like, and thus have a smaller thermal capacity, and it is thus possible to relatively easily carry out the temperature control. It is then possible to carry out the temperature control (temperature calibration) of the detectors via the preload bolts without the thermal influence of the bearing housing and the like.

In the above-described fourth embodiment, the temperature sensors are preferably provided in the coolant passages of the preload bolts. The temperature sensors are electrically connected to the temperature control unit which can control the temperature of the coolant supplied to the coolant passages of the preload bolts.

Since the feedback control can be provided for the coolant itself by means of the coolant temperature detected by the temperature sensors with this configuration, the temperature control is directly carried out, resulting in even higher accuracy thereof.

There has been a proposed and publicly known configuration that a coolant passage on the device side is provided to pass a coolant close to a bearing portion in a spindle device (refer to patent document 1). Therefore, in the fourth embodiment, if the coolant passage on the device side is provided, the device-side temperature sensor is provided close to the detectors, and the device-side temperature sensor is also electrically connected to the temperature control unit.

With this configuration, the temperature control unit can provide the temperature control for at least either one of the coolant fed to the coolant passage of the preload bolts and the coolant fed to the device side coolant passage based on the difference between the temperature data acquired by the temperature sensors in the preload bolts and the temperature data acquired by the device-side temperature sensor. With this configuration, the accuracy of the temperature control can be increased further.

Further, according to the fourth embodiment, the coolant supplied to the coolant passages in the preload bolts can be a gas, and the atmosphere releasing portions can be provided on the downstream side of the coolant passages.

On the other hand, the coolant can be a liquid, and the downstream side of the coolant passages is caused to properly communicate with the coolant recovery passages, and the coolant recovery passages are caused to communicate with the upstream side of the coolant passages thereby forming circulating passages as a whole in this case.

INDUSTRIAL APPLICABILITY

According to the present invention, highly precise measurements can be acquired in the various types of the tire uniformity measurements of a tire.

The lock piece and the receiving portions which receive the separating forces of the both spindles hardly present wears due to the separating forces for a long period.

The accuracy of the uniformity measurement of the tire can be increased by correcting the gaps between the inner ring and the rolling elements and between the outer ring and the rolling elements of the spindle bearing.

The influence due to a temperature increase of the bearing housing and the like generated by the operation (rotation of a tire under test) hardly appear, resulting in highly precise measurements.

The invention claimed is:

1. A tire testing machine comprising:
a first tubular spindle that comprises one of a pair of rims,
a columnar second spindle that comprises the other one of said pair of rims, and is contained in said first spindle,
a lock portion that is provided on a peripheral wall of either one of said first and second spindles,
a lock piece that is provided on the other one of said first and second spindles to engage with said lock portion thereby preventing said first and second spindles from separating from each other, and
spindle direction engaging means that brings said lock piece and said lock portion in an engaged state in close contact with each other in an axial direction of said spindles by relatively separating said both spindles when a tire is not mounted on said rims, and said lock piece is engaged with said lock portion.

2. The tire testing machine according to claim 1, wherein said spindle direction engaging means includes a pressing force supply passage that applies a pressing force to both said spindles by supplying a space formed between both said spindles with a gas when said lock piece is engaged with said lock portion.

3. The tire testing machine according claim 2, wherein said pressing force supply passage branches from a tire pressure supply passage that is used to inflate a tire, and said spindle direction engaging means comprises a plug body that forcefully feeds a gas supplied to the tire pressure supply passage to said pressing force supply passage.

4. The tire testing machine according to claim 2, wherein said spindle direction engaging means comprises a seal in a ring shape between said first spindle and said second spindle to cause the space to be airtight.

5. A run out measuring method for a tire testing machine that measures a run out of a pair of rims on the tire testing machine that externally engages a first spindle that includes one of the rims with a second spindle that includes the other one of the rims, positions both the spindles by engaging a lock piece provided on one of the spindles with a lock portion provided on the other one of the spindles, mounts a tire on both the rims, and measures a tire uniformity, comprising:
engaging the lock piece and the lock portion with each other;
supplying a space formed between the first spindle and the second spindle with a gas;
relatively separating both the spindles by means of the supplied gas to bring the lock piece and the lock portion in an engaged state in close contact with each other in an axial direction of the spindles; and
measuring a run out of the rims while a tire is not mounted.

6. A tire testing machine comprising:
a tubular first spindle that comprises one of a pair of rims, and a lock portion on an inner wall,
a columnar second spindle that comprises the other one of said pair of rims, and is contained in said first spindle, and
a lock piece that is engaged with said second spindle so as to radially protrude from and retract into said second spindle between a position to engage with said lock portion to prevent said first spindle and said second spindle from being separated in the spindle direction, and a position to retract from said lock portion,
wherein said second spindle comprises a groove that extends in a peripheral direction along an outer periphery thereof, and is in sliding contact with said lock piece, and said lock piece and a sliding contact surface of said groove are receiving portions that are formed as flat surfaces to receive separating forces of said both spindles.

7. The tire testing machine according to claim 6, wherein said lock portion is formed across an entire periphery of an inner wall of said first spindle, an extreme end portion of said lock piece is along approximately an entire periphery of an outer periphery of said second spindle upon being retracted from said lock portion, and said extreme end portion of said lock piece is locked to approximately an entire periphery of said lock portion.

8. The tire testing machine according to claim 6, wherein said second spindle comprises a through hole that passes through in the radial direction thereof, said lock piece comprises a support portion in a bar shape that is engaged with and inserted into said through hole, and an extreme end portion that is provided on an extreme end side of said support portion, and comprises said receiving portion, and the width in the peripheral direction of said receiving portion of said extreme end portion is set to be larger than the width in the peripheral direction of said support portion.

9. A tire testing machine comprising:
a spindle that detachably mounts a tire,
a spindle bearing that rotationally supports said spindle, and
a correction device that collects a gap between an inner ring of said spindle bearing and a rolling element of said spindle bearing, or a gap between an outer ring of said spindle bearing and said rolling element of said spindle bearing while said spindle is being rotated.

10. The tire testing machine according to claim 9, wherein said correction device comprises a pressing body that is provided to move in the spindle axial direction, and moves to press said outer ring, thereby correcting the gap, and a pressure supply passage that applies a pressure of a fluid to said pressing body to move said pressing body by means of the pressure of the fluid.

11. The tire testing machine according to claim 10, wherein the fluid is also used as a cooling fluid used to cool said spindle device.

12. A tire testing machine comprising:
a spindle device that rotationally holds a tire in a state inflated at a predetermined internal pressure,
a drum device which transmits a rotational force to the tire by bringing a drum in contact with an outer peripheral surface of the tire held by said spindle device, and
a detector that is provided on said spindle device, and can measure a load generated by the tire,
wherein said detector is fixed to said spindle device by inserting a preload bolt through a mounting hole that is provided through a center portion of said detector, and a coolant passage formed by hollowing at least a portion which passes said mounting hole of said detector is provided in said preload bolt, and a coolant can be supplied to said coolant passage.

13. The tire testing machine according to claim 12, further comprising a temperature sensor in said coolant passage of said preload bolt,
wherein said temperature sensor is electrically connected to a temperature control unit which can carry out temperature control of the coolant supplied to said coolant passage of said preload bolt.

14. The tire testing machine according to claim 13, further comprising a device-side temperature sensor that is provided close to said detector on said spindle device,
wherein said device-side temperature sensor is electrically connected to said temperature control unit, and said temperature control unit can control the temperature of the coolant supplied to at least either one of said coolant passage in said preload bolt and a proper coolant passage on a spindle device side based on a difference between temperature data of said temperature sensor provided in said coolant passage of said preload bolt and temperature data of said device-side temperature sensor.

15. The tire testing machine according to claim 12, wherein the coolant supplied to said coolant passage of said preload bolt is a gas, and an atmosphere releasing portion is provided on a downstream side of said coolant passage.

16. The tire testing machine according to claim 12, wherein the coolant supplied to said coolant passage of said preload bolt is a liquid, and a circulating passage is formed by causing a downstream side of said coolant passage to communicate with an upstream side of said coolant passage via a coolant recovering passage.

* * * * *

UNITED STATES PATENT AND TRADEMARK OFFICE
CERTIFICATE OF CORRECTION

PATENT NO. : 7,340,947 B2
APPLICATION NO. : 11/578415
DATED : March 11, 2008
INVENTOR(S) : Yoshiyuki Shinomoto et al.

Page 1 of 1

It is certified that error appears in the above-identified patent and that said Letters Patent is hereby corrected as shown below:

On the title page, Item (73), the Assignee Item (73) should read:
--(73) Assignee: Kabushiki Kaisha Kobe Seiko Sho (Kobe Steel, Ltd.), Kobe-shi (JP)--

Signed and Sealed this

Twenty-ninth Day of September, 2009

David J. Kappos
*Director of the United States Patent and Trademark Office*